United States Patent
Soelberg

(10) Patent No.: US 12,164,679 B2
(45) Date of Patent: *Dec. 10, 2024

(54) METHOD AND APPARATUS FOR VIRTUALIZING A COMPUTER ACCESSORY

(71) Applicant: STEELSERIES ApS, Copenhagen SV (DK)

(72) Inventor: Tino Soelberg, Chicago, IL (US)

(73) Assignee: STEELSERIES ApS, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/480,594

(22) Filed: Oct. 4, 2023

(65) Prior Publication Data

US 2024/0028109 A1     Jan. 25, 2024

Related U.S. Application Data

(63) Continuation of application No. 17/876,606, filed on Jul. 29, 2022, now Pat. No. 11,809,614, which is a
(Continued)

(51) Int. Cl.
    *G06F 3/01*      (2006.01)
    *A63F 13/212*      (2014.01)
    (Continued)

(52) U.S. Cl.
CPC ............ *G06F 3/011* (2013.01); *A63F 13/212* (2014.09); *A63F 13/22* (2014.09); *A63F 13/23* (2014.09); *A63F 13/25* (2014.09); *A63F 13/5255* (2014.09); *A63F 13/53* (2014.09); *A63F 13/65* (2014.09); *G06F 3/0325* (2013.01); *A63F 13/211* (2014.09); *A63F 13/213* (2014.09);
(Continued)

(58) Field of Classification Search
CPC ...................................................... G06F 3/011
See application file for complete search history.

(56) References Cited

U.S. PATENT DOCUMENTS 6,611,253 B1    8/2003    Cohen
6,614,422 B1    9/2003    Rafii et al.
(Continued)

OTHER PUBLICATIONS

HTC Vive Tracker Developer Guidelines, Ver. 1.3, 2016-2017, pp. 1-42.
(Continued)

*Primary Examiner* — William Boddie
*Assistant Examiner* — Andrew B Schnirel
(74) *Attorney, Agent, or Firm* — Guntin & Gust, PLC; Robert Gingher

(57) ABSTRACT

A system that incorporates the subject disclosure may include, for example, device may perform operations for receiving a signal from an operational space associated with an accessory device, determining hand feature information according to the signal, accessing device location information associated with the computing accessory device, generating hand-device interaction information according to the hand feature information and device location information associated with the accessory device, and transmitting the hand-device interaction information to a virtual reality system, wherein the virtual reality system generates, according to the hand-device interaction information, a virtual hand and a virtual accessory device in a virtual reality image. Additional embodiments are disclosed.

20 Claims, 17 Drawing Sheets

Related U.S. Application Data continuation of application No. 15/867,901, filed on Jan. 11, 2018, now Pat. No. 11,460,911.

(51) Int. Cl.
| | |
|---|---|
| *A63F 13/22* | (2014.01) |
| *A63F 13/23* | (2014.01) |
| *A63F 13/25* | (2014.01) |
| *A63F 13/5255* | (2014.01) |
| *A63F 13/53* | (2014.01) |
| *A63F 13/65* | (2014.01) |
| *G06F 3/03* | (2006.01) |
| *A63F 13/211* | (2014.01) |
| *A63F 13/213* | (2014.01) |
| *G06F 3/02* | (2006.01) |

(52) U.S. Cl.
CPC .... *A63F 2300/8082* (2013.01); *G06F 3/0227* (2013.01)

(56) References Cited

U.S. PATENT DOCUMENTS

| | | | |
|---|---|---|---|
| 7,042,442 | B1 | 5/2006 | Kanevsky et al. |
| 9,965,038 | B2 | 5/2018 | Walline et al. |
| 2001/0044858 | A1 | 11/2001 | Rekimoto |
| 2002/0130844 | A1 | 9/2002 | Natoli |
| 2004/0032398 | A1 | 2/2004 | Ariel et al. |
| 2010/0079369 | A1 | 4/2010 | Hartmann et al. |
| 2010/0177035 | A1 | 7/2010 | Schowengerdt et al. |
| 2012/0227006 | A1 | 9/2012 | Amm |
| 2012/0249587 | A1 | 10/2012 | Anderson et al. |
| 2014/0368455 | A1 | 12/2014 | Croisonnier et al. |
| 2015/0268739 | A1 | 9/2015 | Sanaullah et al. |
| 2016/0313816 | A1 | 10/2016 | Krishnakumar et al. |
| 2017/0307889 | A1 | 10/2017 | Newman |
| 2017/0315722 | A1 | 11/2017 | Yao |
| 2018/0284982 | A1 | 10/2018 | Veeramani et al. |
| 2019/0094982 | A1 | 3/2019 | Imm et al. |
| 2019/0212808 | A1 | 7/2019 | Soelberg |
| 2019/0265781 | A1 | 8/2019 | Kehoe et al. |
| 2022/0365591 | A1 | 11/2022 | Soelberg |

OTHER PUBLICATIONS

Brown, Matt, et al., VR meets the real world, Everything we know about the Vive Tracker, https://www.vrheads.com/everything-we-know-about-vive-tracker, Nov. 17, 2017, pp. 1-8.

Constine, Josh, Zuckerberg shows off Oculus gloves for typing in VR; https://techcrunch.com/2017/02/09/oculus-gloves/, Feb. 9, 2017, pp. 1-9.

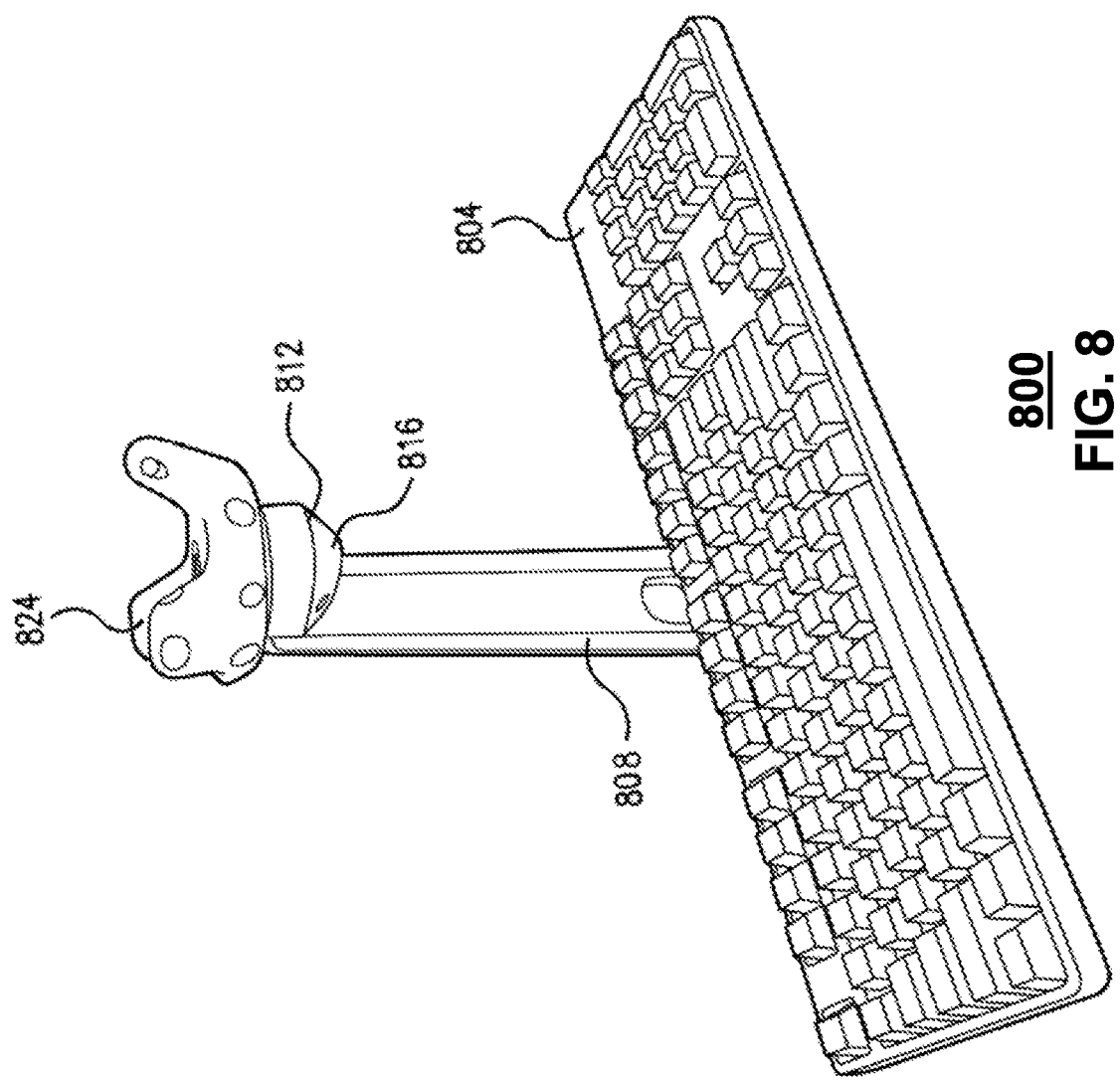

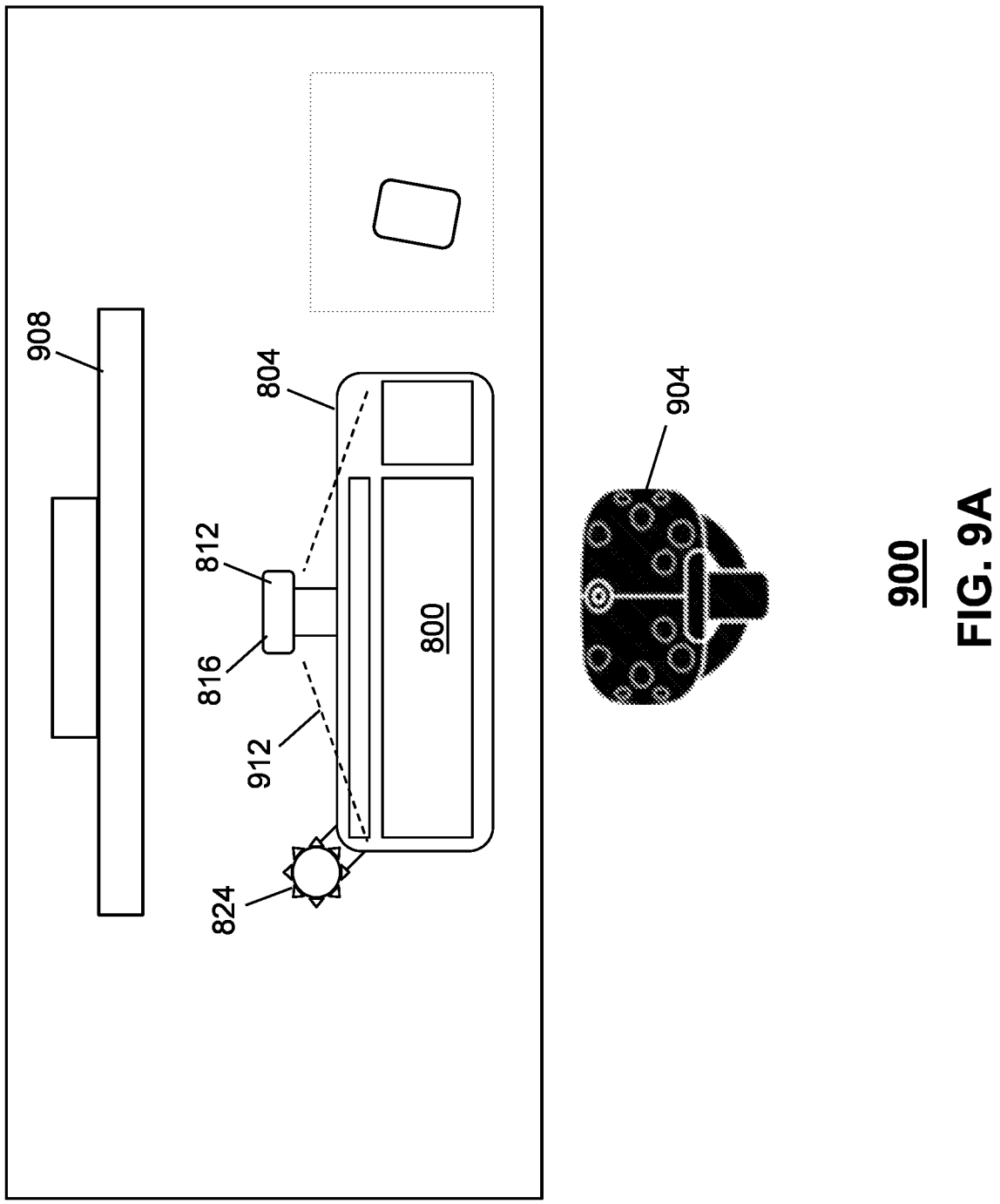

1100

METHOD AND APPARATUS FOR VIRTUALIZING A COMPUTER ACCESSORY

CROSS REFERENCE TO RELATED APPLICATIONS

This application is a continuation of U.S. patent application Ser. No. 17/876,606, filed on Jul. 29, 2022, which is a continuation of U.S. patent application Ser. No. 15/867,901 filed on Jan. 11, 2018. All sections of the aforementioned applications are incorporated by reference herein in their entirety.

FIELD OF THE DISCLOSURE

The present disclosure relates generally to a method and apparatus for virtualizing a computer accessory.

BACKGROUND

It is common today for gamers to utilize more than one gaming accessory. This is especially true of gamers who play on-line games or competitive games in a team or individual configuration. Gamers can have at their disposal accessories such as a keyboard, a general-purpose gaming pad, a mouse, a gaming console controller, a headset to communicate with other players, a joystick, a computer console, or other common gaming accessories.

A gamer can frequently use a combination of these accessories in a single game (e.g., headset, keyboard, and mouse). Efficient management and utilization of these accessories can frequently impact a gamer's ability to compete. Accessory management can have utility in other disciplines which may not relate to gaming applications. Efficient use of accessories in these other disciplines can be important to other users.

Virtual Reality (VR) products have increased in availability and consumer acceptance. VR applications, typically in the gaming and entertainment space but also for development and training, have altered the landscape for computer input and output devices. Consumers demand input, output, and accessory devices that complement VR capabilities and expectations.

BRIEF DESCRIPTION OF THE DRAWINGS

Reference will now be made to the accompanying drawings, which are not necessarily drawn to scale, and wherein:

FIG. 8 depicts an illustrative embodiment of a virtualized accessory device;

FIGS. 9A and 9B depict illustrative embodiments of a system including a virtualized accessory device;

DETAILED DESCRIPTION

Figure 1:
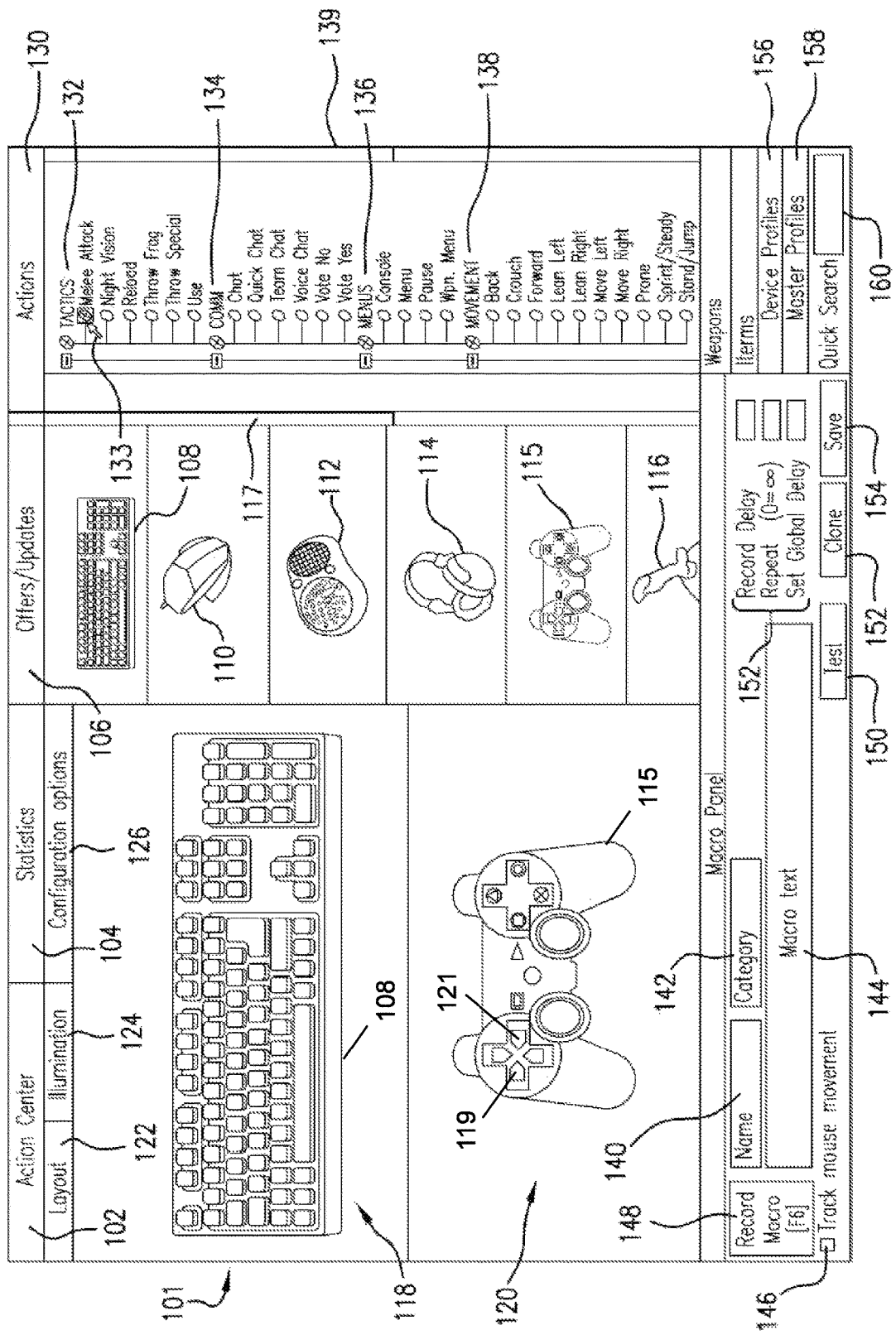
FIG. 1 depicts an illustrative embodiment of a Graphical User Interface (GUI) generated by an Accessory Management Software (AMS) application according to the present disclosure.

The subject disclosure describes, among other things, illustrative embodiments for virtualizing an accessory device. In one or more embodiments, a system can receive infrared light from an operational space associated with the accessory device. Based on the received infrared light, the system can determine hand feature information from the operation accessory device. The system can map the hand feature information and device location information to generate a set of hand-device information that is associated with the operational space. The system can then transmit the hand-device information to a virtual reality operating system, which can generate virtual versions of the accessory device and operator hand (or hands) that can be displayed in a virtual environment of a virtual reality application. Other embodiments are described in the subject disclosure.

One embodiment of the subject disclosure includes a method, performed by a processing system including a processor, where the method can include projecting first infrared light into an operational space associated with an accessory device and receiving second infrared light from the operational space associated with the accessory device. The method can also include generating a hand image according to a first portion of the second infrared light that is received and, in turn, determining hand feature information from the hand image according to device location information associated with the accessory device. The method can further include mapping the hand feature information and the device location information to generate hand-device interaction information associated with the operational space. The method can also include modifying the hand-device interaction information according to input data associated with the accessory device to generate modified hand-device interaction information. The method can further include transmitting the modified hand-device interaction information to a virtual reality operating system. The modified hand-device interaction information can be provided to a virtual reality application by the virtual reality operating system. The virtual reality application can superimpose a virtual hand and a virtual accessory device onto a virtual reality image according to the modified hand-device interaction information.

One embodiment of the subject disclosure includes a machine-readable storage medium, including instructions, where, responsive to executing the instructions, a processing system including a processor can performs operations including receiving image information from an operational space associated with an accessory device and, in turn, generating a hand image from a first portion of the image information that is received. The operations can also include determining hand feature information from the hand image according to device location information associated with the accessory device. The operations can further include generating hand-device interaction information associated with the operational space according to the hand feature information and the device location information. The operations can also include transmitting hand-device interaction information to a virtual reality operating system. The hand-device interaction information can be provided to a virtual reality application by the virtual reality operating system. The virtual reality application can superimpose a virtual hand and a virtual accessory device onto a virtual reality image according to the hand-device interaction information.

One embodiment of the subject disclosure includes a device including a memory to store instructions and a processing system including a processor coupled to the memory, wherein responsive to executing the instructions, the processor performs operations including receiving a signal from an operational space associated with an accessory device and, in turn, determining hand feature information according to the signal. The operations can also include generating hand-device interaction information according to the hand feature information and device location information associated with the accessory device. The operations can further include transmitting the hand-device interaction information to a virtual reality system. The virtual reality system can generate, according to the hand-device interaction information, a virtual hand and a virtual accessory device in a virtual reality image.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a tablet, a server, a mainframe computer, a gaming console, a gaming accessory, an accessory device, or any combination or portions thereof. The AMS application can also be executed by portable computing devices such as a cellular phone, a personal digital assistant, or a media player. The AMS application can be executed by any device with suitable computing and communication resources.

Figure 2:
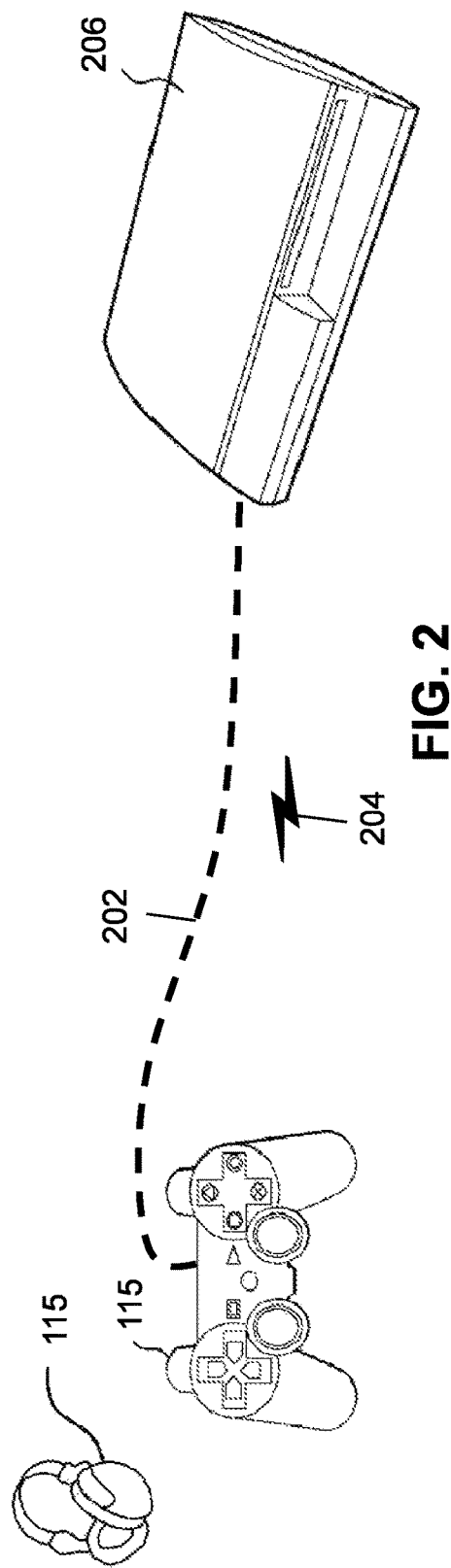
FIGS. 2-3 depict illustrative embodiments for communicatively coupling a gaming controller to a computing device.

FIG. 2 illustrates a number of embodiments for utilizing a gaming controller 115 with a computing device 206 in the form of a gaming console. In the illustration of FIG. 2, the gaming controller 115 can be communicatively coupled to the gaming console 206 with a tethered cable interface 202 such as a USB or proprietary cable, or a wireless interface 204 such as Wi-Fi, Bluetooth, ZigBee, or a proprietary wireless communications protocol. The cable interface 202 provides a means for communication that may be less susceptible to electromagnetic interference. It will be appreciated that the gaming controller 115 may further include a keyboard device 108 or a headset 114 (with or without a microphone not shown) utilized by a gamer to communicate with teammates and/or to listen to game sounds in high fidelity. In the illustration of FIG. 2, the AMS application can in whole or in part be executed by the gaming controller 115, the gaming console 206, or a combination thereof.

Figure 3:
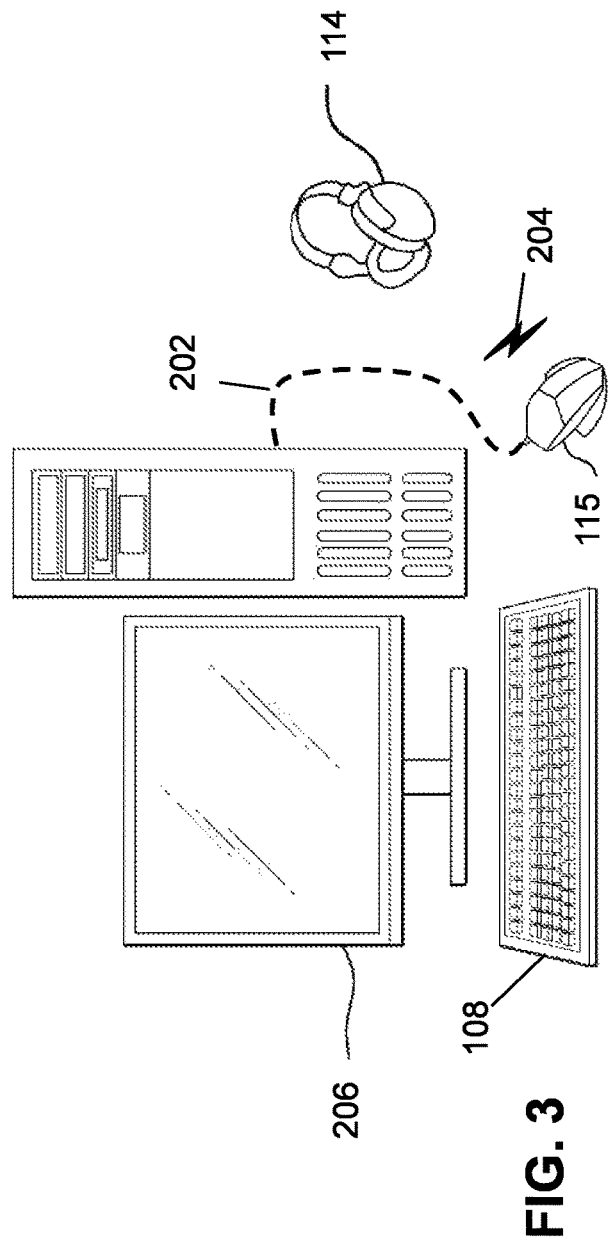

FIG. 3 illustrates a number of other embodiments for utilizing a gaming controller 115 or 112 with a computing device 206. In this embodiment, the gaming controller 115 comprises a mouse and the computing device 206 comprises a computer. The gaming controller 115 can be tethered to the computing device 206 by a cable interface 202 (e.g., USB cable or proprietary cable) or a wireless interface 204. The cable interface 202 provides a means for communication that may be less susceptible to electromagnetic interference. It will be appreciated that the gaming controller 115 may further include a keyboard device 108 or a headset (with or without a microphone not shown) utilized by a gamer to communicate with teammates and/or to listen to game sounds in high fidelity. In the illustration of FIG. 3, the AMS application can in whole or in part be executed by the gaming controller 115, the gaming console 206, or a combination thereof.

For illustration purposes, the terms gaming console 206 and computer 206 will be used hence forth interchangeably with the term computing device 206 with an understanding that a computing device 206 may represent a number of other devices such as a server, a tablet, a smart phone, and so on. Accordingly, computing device 206 can represent any device with suitable computing resources to perform the methods described in the subject disclosure.

Figure 4:
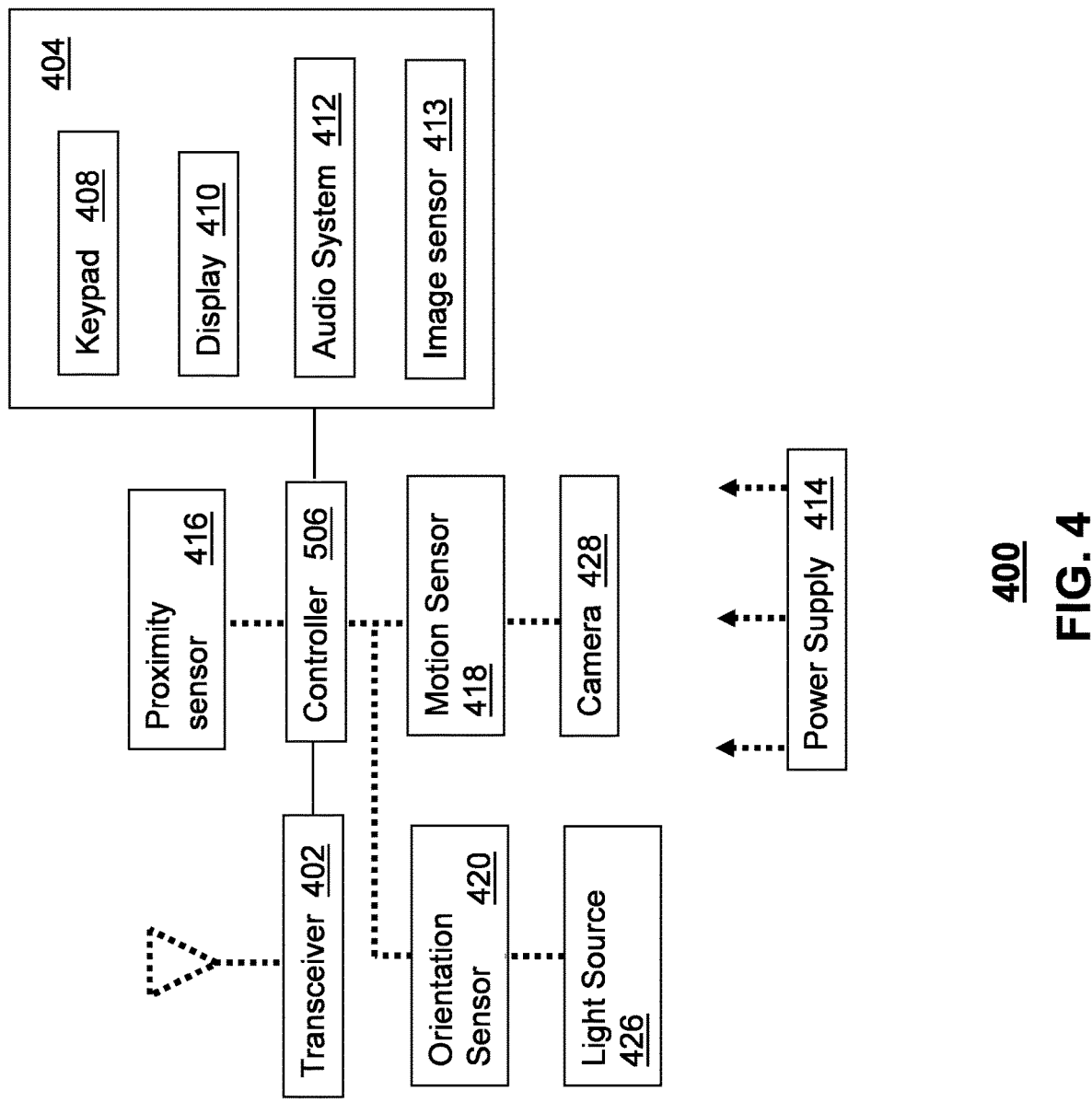
FIG. 4 depicts an illustrative embodiment of a communication device.
Figure 5:
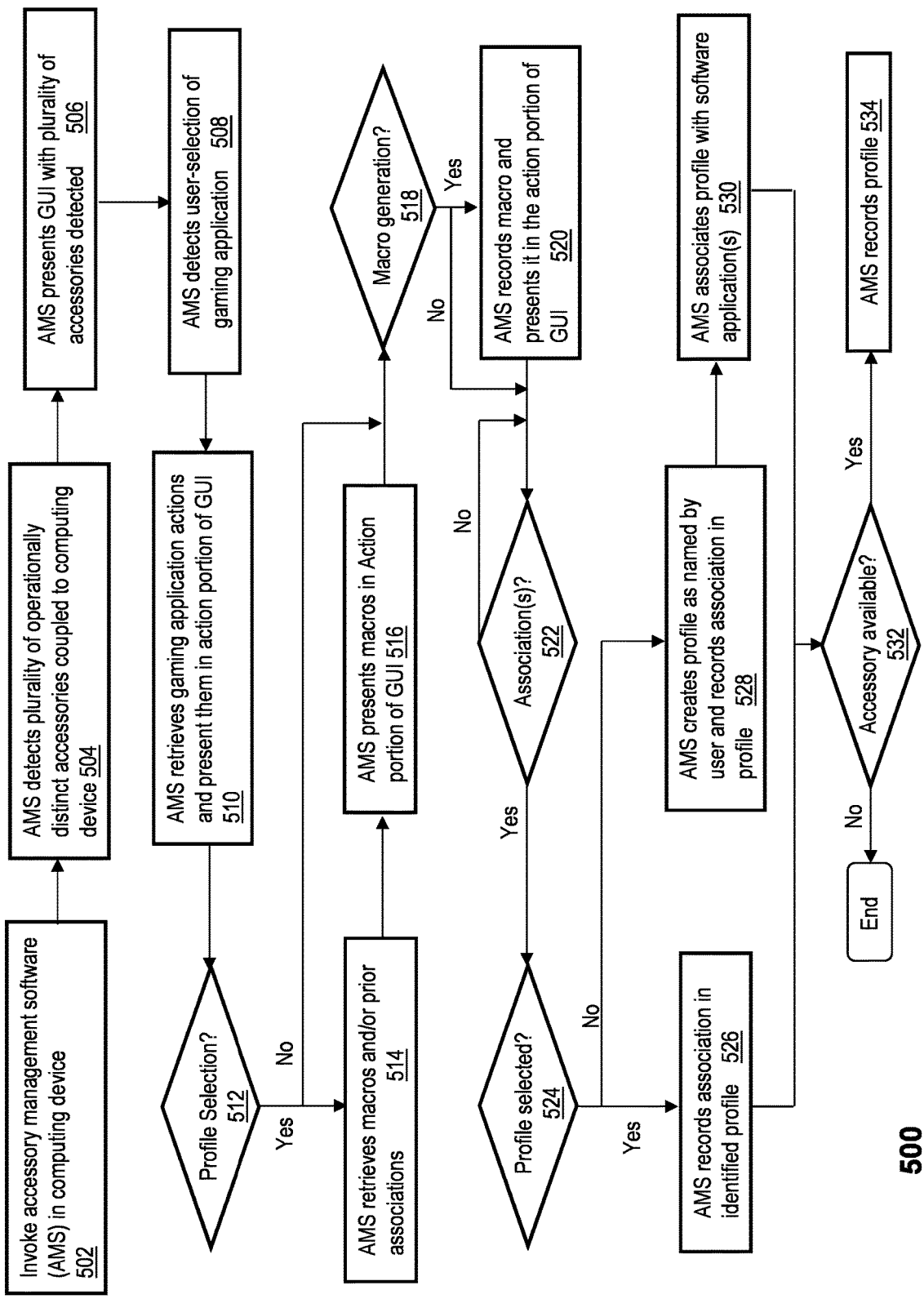
FIG. 5 depicts an illustrative embodiment of a first method utilized in the subject disclosure.

FIG. 4 depicts an illustrative embodiment of a communication device 400. Communication device 400 can serve in whole or in part as an illustrative embodiment of devices described in the subject disclosure. The communication device 400 can comprise a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, Wi-Fi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 utilizes touch-sensitive technology, a portion or all of the keypad 408 can be presented by way of the display 410 with navigation features. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high-volume audio (such as speakerphone for hands free operation, stereo or surround sound system). The audio system 412 can further include a microphone for receiving audible signals from an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, Wi-Fi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Communication device 400 can serve as an accessory device for a computer system. For example, the communication device 400 can be a keyboard device 108, a mouse device 110, or a game controller 115. In one or more embodiments, the communication device 400 can provide virtualization capabilities. Communication device 400 can facilitate detection of user interactions with the accessory device in real space, where these user interactions can be translated to a VR domain for presentation in the VR space.

The communication device 400 can include a light source 426. In one embodiment, the light source 426 can provide light to an operational area associated with a communication device 400. For example, light can be provided to an area associated with user interaction or operation of an accessory device, such as a keyboard device 108. The light source 426 generates and/or project infrared light or any other lighting frequency that can be used to illuminate, detect, or expose physical positions and/or interactions between a user and keyboard device 108. In one embodiment, the light source 426 can provide light to illuminate and/or reflect from fingers, fingertips, and other features of a user's hand or hands. The light source 426 can provide light to illuminated and/or reflect from features of the accessory device to provide position and/or orientation information for accessory device. The light source 426 can be included in the communication device 400 or can be included in another communication device 400.

The communication device 400 can include a camera 428. In one embodiment, the camera 428 can capture light from an operational area associated with of a communication device 400. For example, the camera 428 can capture light emanating from or reflected off of a communication device 400, a user feature (such as a user's hand or fingertip, and/or an accessory device. In one embodiment, the camera 428 can receive light in or near the infrared spectrum. Infrared light is typically generated associated with the transmission of heat. So, for example, many living things, such as human beings, will give off heat in the form of infrared radiation. This infrared radiation can be captured as infrared light via a camera 428. Therefore, if a user is interacting with an accessory device, such as a keyboard device 108, using her hand(s), then the camera 428 can capture infrared light that is emitted from her hand(s). In one embodiment, the camera 426 can be designed (or the incoming light can be sufficiently filtered) to accept light in or near the infrared spectrum while rejecting or ignoring light in other parts of the light spectrum. In this way, the camera 426 can lock in on the infrared light while rejecting other light frequency components. In one embodiment, the camera 428 can capture light that is reflected from user features, such as the user's hands, and/or that is emitted or reflected from the accessory device. The camera 426 can capture features of the user and features of the accessory device.

In one embodiment, the images captured by the camera 426 can be used to determine location information for the features of a user's hand(s) as those features interact with the accessory device. For example, the capture images can provide real time locations of fingers, fingertips, hands, and so forth, which can be used to determine and/or confirm keystrokes. The capture images can also provide real time location and/or orientation information for the accessory device. For example, light can be captured as it is reflected from and/or emitted from orientation markings on the accessory device. Real time information on the location of the user features and the location of the accessory device can be provided to a VR operating system and/or VR application. The VR operating system and/or application can convert the real time information on user-device interactions into the VR space where, for example, virtualized versions of the user's hand(s) and the accessory device can be generated and presented in the VR space. In this way, the user experience in the VR space can be enriched by the visual presence of her hand(s) and the computer accessory device and the user's ability to operate the accessory device will be enhanced. In short, the user can see in VR (e.g., through VR goggles) what her hands are doing in real space with the accessory device.

The communication device 400 as described herein can operate with more or less components described in FIG. 4 to accommodate the implementation of devices described by the subject disclosure. These variant embodiments are contemplated by the subject disclosure.

FIGS. 5-7A depicts methods 500-700 describing illustrative embodiments of the AMS application. Method 500 can begin with step 502 in which the AMS application is invoked in a computing device. The computing device can be a remote server (not shown), the gaming console 206 or computer 206 of FIGS. 2-3, or any other computing device with suitable computing resources. The invocation step can result from a user selection of the AMS application from a menu or iconic symbol presented by the computing device 206, or when a user communicatively couples a gaming controller 115 or other form of accessory device with the computing device 206. In step 504, the AMS application can detect by way of software drivers in an operating system (OS) of the computing device 206 a plurality of operationally distinct accessories communicatively coupled to the computing device 206. The accessories can be coupled to the computing device 206 by a tethered interface (e.g., USB cable), a wireless interface (e.g., Bluetooth or Wireless Fidelity—Wi-Fi), or combinations thereof.

In the present context, an accessory can represent any type of device which can be communicatively coupled to the computing device 206 (or which can be an integral part of the computing device) and which can control aspects of the OS and/or a software application operating from the computing device 206. An accessory can represent for example a keyboard, a touch screen display, a gaming pad, a gaming controller, a mouse, a joystick, a microphone, or a headset with a microphone—just to mention a few.

In step 506, the AMS application presents a GUI 101 such as depicted in FIG. 1 depicting operationally distinct accessories such as a keyboard 108, and a gaming controller 115. GUI 101 presents the accessories 108-116 in a scrollable section 117. One or more accessories can be selected by a user with a mouse pointer. In this illustration, keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a video game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack". For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the keyboard 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the AMS application can be configured so that the Melee Action can be associated with a combination of key button presses (e.g., simultaneous depression of the left and right buttons 119, 121, or a sequence of button depressions: two rapid left button depressions followed by a right button depression).

In yet another embodiment, the AMS application can be configured so that the Melee Action can be associated with movement of the gaming controller 115 such as, for example, rapid movement or shaking of the gaming controller 115. In a further embodiment, the AMS application can be adapted to make associations with two dimensional or three-dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can monitor gaming venue states by analyzing captured images produced by the gaming application (e.g., one or more still images of a tank, or a video of an avatar entering a tank), and/or by receiving messages from the gaming application by way of an application programming interface (API) thereby enabling the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by the OS of the computing device 206, or any other recordable stimulus to initiate, control or manipulate software applications. For instance, a macro can represent a user entering the identity of a software application (e.g., instant messaging tool) to be initiated by the OS upon the AMS application detecting a speech command using speech recognition technology.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. Clone button 152 can be selected to replicate the macro sequence if desired. Fields 152 can also present timing characteristics of the stimulation sequence in the macro with the ability to modify and thereby customize the timing of one or more stimulations in the stimulation sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions with input functions of the keyboard 108 or the gaming controller 115. Associations can also be made based on the two- or three-dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

Referring back to step 526, once the associations have been recorded in a profile, the AMS application can determine in step 532 which of the accessories shown illustratively in FIGS. 1-3 are programmable and available for programming. If the AMS application detects that an accessory (e.g., keyboard 108, gaming controller 115) is communicatively coupled to the computing device 206 and determines that the accessory is capable of performing stimulus substitutions locally, the AMS application can proceed to step 534 of FIG. 5 where it submits the profile and its contents for storage in the accessory (e.g., the gaming controller 115 in FIGS. 2-3). Once the accessory (e.g., the gaming controller 115) is programmed with the profile, the accessory can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can present a layout of the accessory (button 122) or can present how the accessory is illuminated when associations between input functions and actions are made (button 124), and configuration options for the accessory (button 126). The AMS application can adapt GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application as described in the subject disclosure. Selecting button 106 can also cause the AMS application to adapt the GUI 101 to present promotional offers and software updates.

The steps of method 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by method 500 or variants thereof. These undisclosed approaches are contemplated by the subject disclosure.

Figure 6:
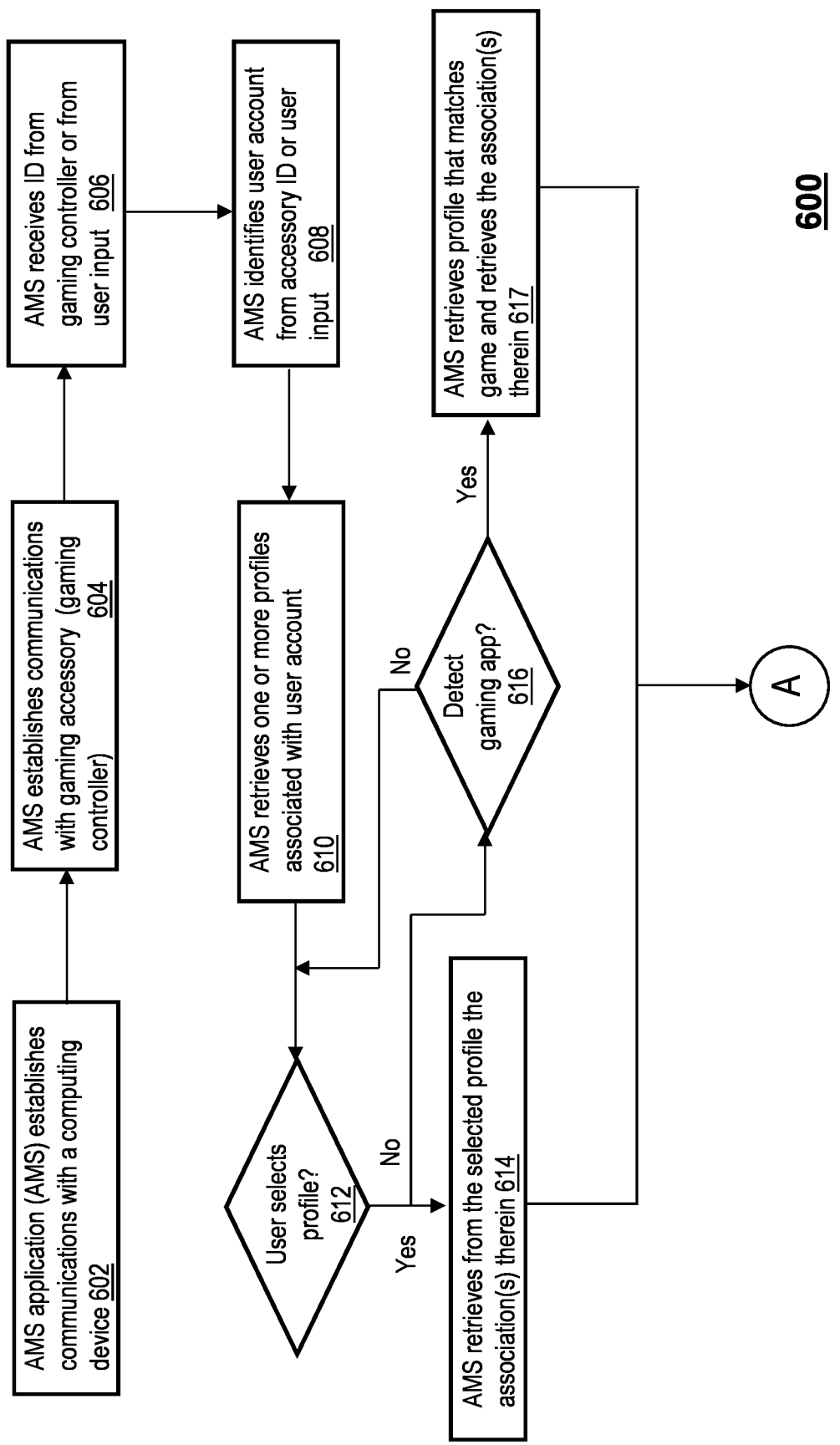
FIG. 6 depicts an illustrative embodiment of a second method utilized in the subject disclosure.

FIG. 6 depicts method 600 for illustrating additional operations of the AMS application. In the configurations of FIGS. 2-3, the AMS application can be operating in whole or in part from the gaming controller 115, a gaming console 206, a computer 206, or a remote server (not shown). For illustration purposes, it is assumed the AMS application operates from the gaming console 206. Method 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation and speech, the invocation of other software applications, macros or other suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three-dimensional lift of the mouse can cause the tank to steer according to the three-dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three-dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again, the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state and can perform substitutions of stimuli generated by the gaming controller 115, and/or speech commands received by microphone of the headset 114.

In one embodiment, the AMS application can be configured in step 719 to retrieve a profile that provides substitute stimuli for replacing certain stimuli generated by accessories. The associations recorded in the profile can be venue independent. In another embodiment, the AMS application can retrieve a combination of profiles, where one or more profiles provide substitute stimuli that are venue dependent and one or more other profiles provide substitute stimuli that are venue independent.

The AMS application can monitor in step 720 stimulations generated by the accessories coupled to the gaming console 206. The stimulations can be generated by the gamer by manipulating the gaming controller 115, and/or by generating speech commands detected by a microphone of the headset 114. If a stimulation is detected at step 720, the AMS application can determine in step 722 whether to forward the detected stimulation(s) to an Operating System (OS) of the gaming console 206 or the gaming application directly without substitutions. This determination can be made by comparing the detected stimulation(s) to corresponding associations in one or more profiles retrieved by the AMS application. If the detected stimulation(s) match the associations, then the AMS application proceeds to step 740 where it retrieves substitute stimulation(s) in the profile(s). In step 742, the AMS application can substitute the detected stimulation(s) with the substitute stimulations in the profile(s).

In one embodiment, the AMS application can track in step 744 the substitute stimulations by updating the stimulations with a unique identifier such as a globally unique identifier (GUID). In this embodiment, the AMS application can also add a time stamp to each substitute stimulation to track when the substitution was performed. In another embodiment, the AMS application can track each substitute stimulation according to its order of submission to the gaming application. For instance, sequence numbers can be generated for the substitute stimulations to track the order in which they were submitted to the gaming application. In this embodiment, the substitute stimulations do not need to be updated with sequence numbers or identifiers so long as the order of gaming action results submitted by the gaming application to the AMS application remain in the same order as the substitute stimulations were originally submitted.

For example, if a first stimulation sent to the gaming application by the AMS application is a command to shoot, and a second stimulation sent to the gaming application is a command to shoot again, then so long as the gaming application provides a first a game action result for the first shot, followed by a game action result for the second shot, then the substitute stimulations will not require updating with sequence numbers since the game action results are reported in the order that the stimulations were sent. If on the other hand, the game action results can be submitted out of order, then updating the stimulations with sequence numbers or another suitable identifier would be required to enable the AMS application to properly track and correlate stimulations and corresponding gaming action results.

Referring back to step 722, if the detected stimulation(s) do not match an association in the profile(s), then the AMS application proceeds to one of steps 744 or 746 in order to track the stimulations of the accessory as described above. In another embodiment, tracking of original stimulations or substitute stimulations can be bypassed by skipping steps 744 or 746 and proceeding to step 770 of FIG. 7B.

Figure 7A:
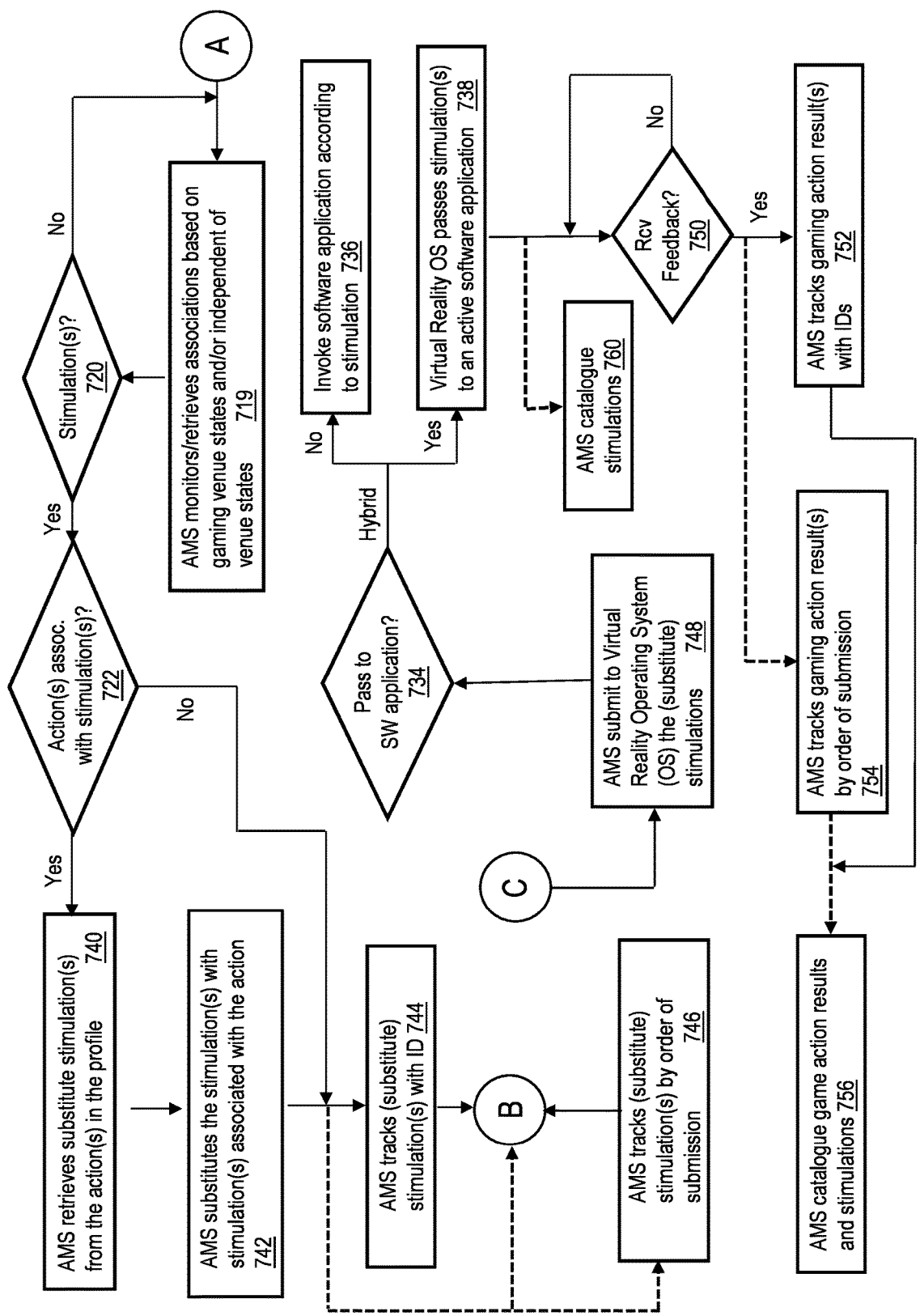
FIG. 7A depicts an illustrative embodiment of a third method utilized in the subject disclosure.
Figure 7B:
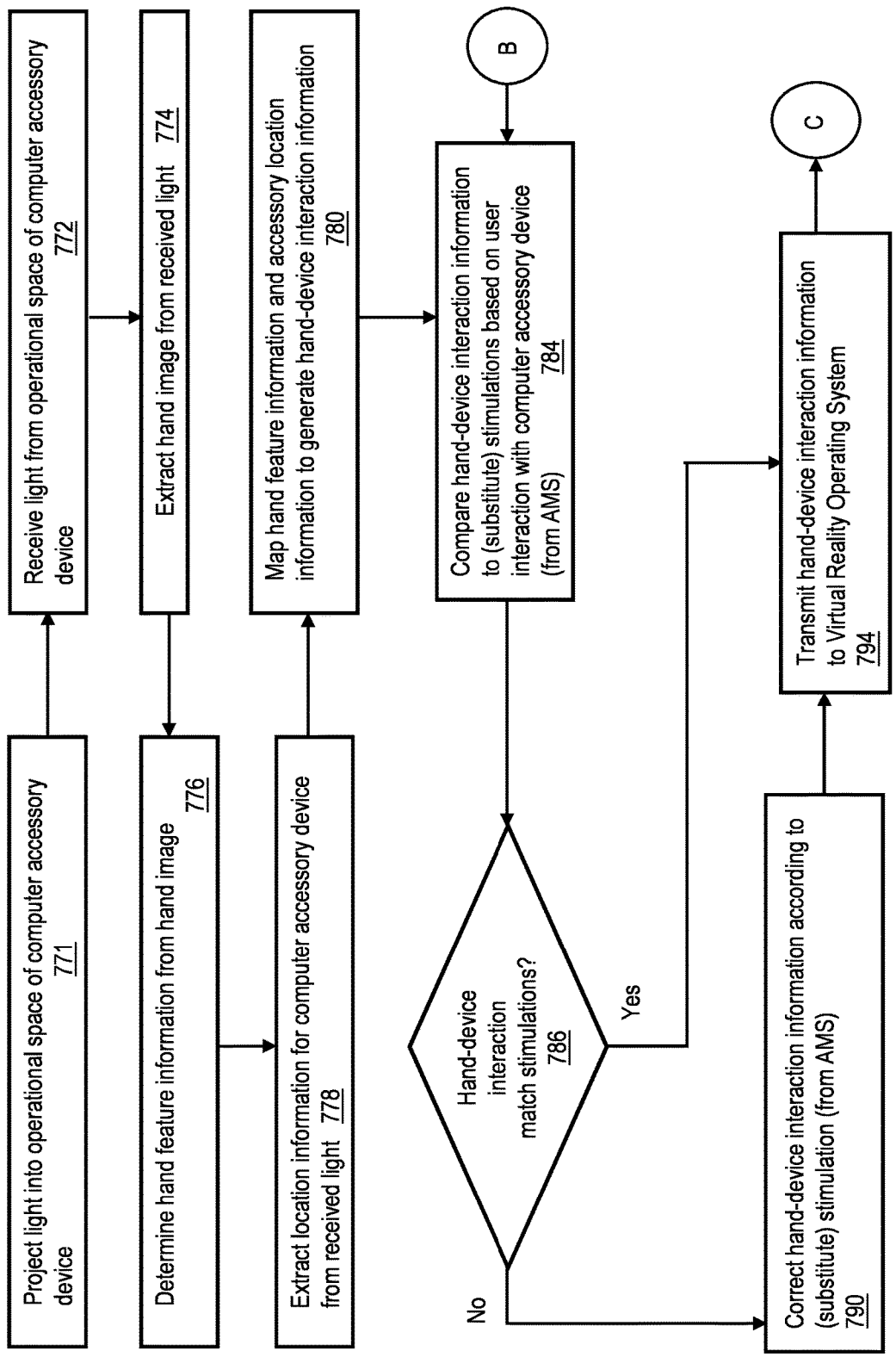
FIG. 7B depicts an illustrative embodiment of a fourth method utilized in the subject disclosure.

Once the stimulations received in step 720 have been substituted with other stimulations at step 742 responsive to a detected association or maintained unchanged responsive to detecting no association with substitute stimuli, and (optionally) the AMS application has chosen a proper tracking methodology for correlating gaming action results with stimulations, the AMS application can proceed to step 771 of FIG. 7B.

Referring now to FIG. 7B, method 770 for providing a virtualization of an accessory device in a VR OS. Many VR applications rely on the use of VR goggles to provide the VR experience to users. In these situations, it is impossible for the user to see the accessory device or their own body (e.g., their hands). Therefore, all interactions with the accessory device, including the positioning of the accessory device and the relative positioning of their body with respect to the accessory device must be performed "blind" without the benefit of quick glances at the accessory device or even the use of peripheral vision to aid in user-device interactions.

In one or more embodiments, method 770 can determine interactions between a user, typically a user's hands, and an accessory device, such as a keyboard device 108. These hand-device interactions can create stimulations that can be evaluated by the AMS, which can pass the stimulations on and/or replace/augment the stimulations with substitute stimulations (as described above). For example, if a user's hand interacts with keyboard device 108 to press a down arrow key, the AMS can detect this stimulation, determine if a substitution is in order, and then pass this stimulation and/or substitute stimulation to the VR OS. The features and various embodiments described for the method 770 can be performed by the AMS, the accessory device, the VR OS or any combination thereof.

At step 771, light can be projected into the operational space of the accessory device. In one embodiment, the light can be infrared light or light of some other particular frequency. For example, if light in the infrared spectrum is projected over an operational area of a keyboard device 108, then interactions between the user's hand(s) and the keyboard device 108 can be captured or detected by capturing images in the infrared spectrum. In another embodiment, the projected light can be in a different spectrum, where this light is captured at a camera 428 that filters out other light components (i.e., light in other parts of the spectrum).

At step 772, light from the operational space can be received at the camera 428. In one embodiment, the captured light can be reflected from the hand(s) of the user. In another embodiment, the captured light can be emitted from the hand(s) of the user. For example, heat radiating from the user's hands can cause infrared light to be emitted from the user's hands. The camera 428 can collect this light. In one embodiment, no light is projected into the operational space. Rather, the camera 428 simply captures ambient light from the operational space. The captured light can be infrared light, such as light emitted from the user's hand(s). The captured light can include light in the visible spectrum.

At step 774, the user's hand image can be extracted from the light that is received. In one embodiment, a pattern recognition technique can be applied to the captured light. For example, where the expected image is a hand or a pair of hands interacting with a keyboard device 108, the captured light can be analyzed to detected image components that consist with a hand or a pair of hands. At step 776, hand feature information can be determined from the hand image. In one embodiment, where the captured light is infrared light, a pattern recognition technique can analyze the captured hand image for areas of differing light intensity. For example, fingers or fingertips may give off greater levels of heat than other parts of the user's hand. Therefore, fingers and/or fingertips can emit greater intensity of infrared light, which can be used to determine particular finger locations. In one embodiment, the pattern recognition can use training techniques, such as capturing light while the user is instructed to place her hand(s) in the operational area and/or types a known pattern into the keyboard device 108. The hand feature information can provide real time hand positions, locations, shapes, and movements. In one embodiment, keyboard device 108 can be constructed of a material that absorbs light in a particular part of the spectrum. For example, a keyboard that absorbs infrared light can serve as an excellent "black" background for the user's hand(s), which can emit and/or reflect infrared light. In this scenario the camera can capture the infrared light from the hand(s) while the absorbing background keyboard device 108 can improve the signal-to-noise ratio (SNR) of the light signal for the hand(s). In one embodiment, an image of the user's hand(s) can be captured and processed in the visible light spectrum.

At step 778, location information for the accessory device can be extracted from the light that is received from the operational space. In one embodiment, the accessory device can emit light or can reflect light that is projected onto it. For example, keyboard device 108 can have a series of light emitting/reflecting markings in a known pattern. The markings can be used to determine a location and an orientation of the keyboard device 108 with respect to the camera 428. In one embodiment, the relative location of the camera 423 and the keyboard device 108 can be fixed and known. For example, the camera 423 can be fixed in location with respect to the keyboard device 108, such as would be the case if the camera 423 is mounted onto the keyboard device 108. In this case, it may not be necessary to derive location information for the accessory device from the captured image data.

At step 780, the hand feature information and the location information can be mapped to generate hand-device interaction information for the operational space. In one embodiment, the location information for the accessory device can provide a known "context" for the determined hand feature information. As each location and/or movement of the hand features plays out over the accessory device context, the hand-device interactions can indicate a sequence of keystrokes. If the accessory device location information is known and fixed with respect to the camera 423, such as in the case of a fixed camera attached to the keyboard, then the hand feature information can simply be mapped onto a known template of the keyboard device 108.

In one or more embodiments, stimulation and/or substitute stimulation information for the accessory device can be accessed from the AMS. That is, the user input stimulation that the AMS has captured from the user's interactions with the accessory device can be accessed. At step 784, the stimulation and/or substitute stimulation information can be compared to the hand-device interaction information. For example, where AMS has received a user input of "up arrow" from a keyboard device 108, this stimulation can be compared to a concurrently determined hand-device interaction that is determined, based on pattern recognition of the hand image and location information for the keyboard device, to also correspond to an "up arrow" input. In this case, the hand-device interaction information and the AMS stimulation are in agreement, at step 786. Alternatively, the hand-device interaction "keystroke" may not match the "keystroke" that is determined by AMS. For example, AMS may detect a stimulation of "up arrow," while the hand image captured at the camera and mapped to the keyboard device location information may generate a hand-device interaction that indicates a user strike of the "page down" key. In this case, the hand-device interaction information and the AMS "keystroke" stimulation are not in agreement, at step 786. In this case, the hand-device interaction information can be corrected so that it agrees with the AMS stimulation and/or substitute stimulation. In one embodiment, the AMS stimulation and/or substitute stimulation is preferred over the image-determined "keystroke." For purposes of presentation at the VR application, the corrected "keystroke" for the hand-device interaction may be preferred.

At step 794, the hand-device interaction information can be transmitted to the VR OS. In one embodiment, AMS can submit the stimulation and/or substitute stimulation to the VR OS concurrently with the hand-device interaction information. The VR OS can provide hand-device interaction information and AMS stimulation information to a VR application. The VR application can translate the hand-device information into the VR domain and, in turn, present the accessory device and/or the user's hand(s) to the user in the context of the VR display. For example, the VR application can present the accessory device and/or the user's hand(s) at a VR goggle device. In one embodiment, an actual image of the hand(s) and accessory device can be sent to the VR OS. The VR OS can then virtualize the accessory device and operator hand(s) based on the actual image from the camera 423.

Once the AMS application at step 748 supplies to a Virtual Reality Operating System (OS) or a Virtual Reality Application of the computing device 206 a gaming action (i.e., one or more stimulations) and the hand-device interaction information from the methods of FIGS. 7A and 7B, the AMS application can proceed to step 734. The gaming action supplied to the Virtual Reality OS at step 748 can be the unadulterated "original" gaming action of step 770, or an alternative gaming action generated by steps 794 or 796. At step 734, the Virtual Reality OS determines whether to invoke in step 736 a software application identified in the stimulation(s) (e.g., gamer says "turn on team chat", which invokes a chat application), whether to forward the received stimulation(s) to the gaming software application in step 738, or combinations thereof.

Contemporaneous to the embodiments described above, the AMS application can monitor in step 750 for game action results supplied by the gaming application via API messages previously described. For instance, suppose the stimulation sent to the gaming application in step 738 is a command to shoot a pistol. The gaming application can determine that the shot fired resulted in a miss of a target or a hit. The gaming application can respond with a message which is submitted by way of the API to the AMS application that indicates the shot fired resulted in a miss or a hit. If IDs such as GUIDs were sent with each stimulation, the gaming application can submit game action results with their corresponding GUID to enable the AMS application to correlate the gaming action results with stimulations having the same GUID.

For example, if the command to shoot included the ID "1234", then the game action result indicating a miss will include the ID "1234", enabling the AMS application in step 752 to correlate the game action result to the stimulation having the same ID. If on other hand, the order of game action results can be maintained consistent with the order of the stimulations, then the AMS application can correlate in step 754 stimulations with game action results by the order in which stimulation were submitted and the order in which game action results are received. In step 756, the AMS application can catalogue stimulations and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulations, and a catalogue for gaming action results correlated to the stimulations.

FIG. 8 illustrates embodiments of an accessory device 800 that can be virtualized into a VR Operating System or VR application. In one or more embodiments, the accessory device 800 can be a user input device, a keyboard device, a mouse device, game controller device, a joystick device, a device that combines keypad and control functions, and/or a device that combines input and output functions, such as haptic feedback. In one embodiment, the accessory device can combine computer accessory functions, such as a keyboard, with an image capturing function and a Virtual Reality (VR) communication function. For example, the accessory device 800 can include a keyboard device 804, a camera device 816, and a VR communication device 824. In this embodiment, the camera device 816 and the VR communication device 824 are attached to the keyboard device 804 using a mounting arm 808. In one embodiment, the accessory device 800 can include a light source 812 that is also attached to the keyboard device 800 via the mounting arm 808.

In one embodiment, the mounting arm 808 can position the camera device 816 over the keyboard device 804 such that the camera device 816 can capture images from an operational area over the keyboard device 804. The operational area can include an area where a user of the keyboard device 804 would place his/her hands while using the keyboard. In one embodiment, the mounting arm 808 can position the light source 812 over the keyboard device 804 such that the light source 812 can project light onto an operational area of the keyboard device 804.

In one or more embodiments, the VR communication device 824 can receive data from the camera device 816. In various embodiments, the data from the camera device 816 can be unprocessed, partially processed, or completely processed before it is provided to the VR communication device 824. The VR communication device 824 can transmit data from the camera device 816 to a VR Operating System for use in presenting a virtualized version of the keyboard and the user's hand(s) in a VR application.

Figure 9B:
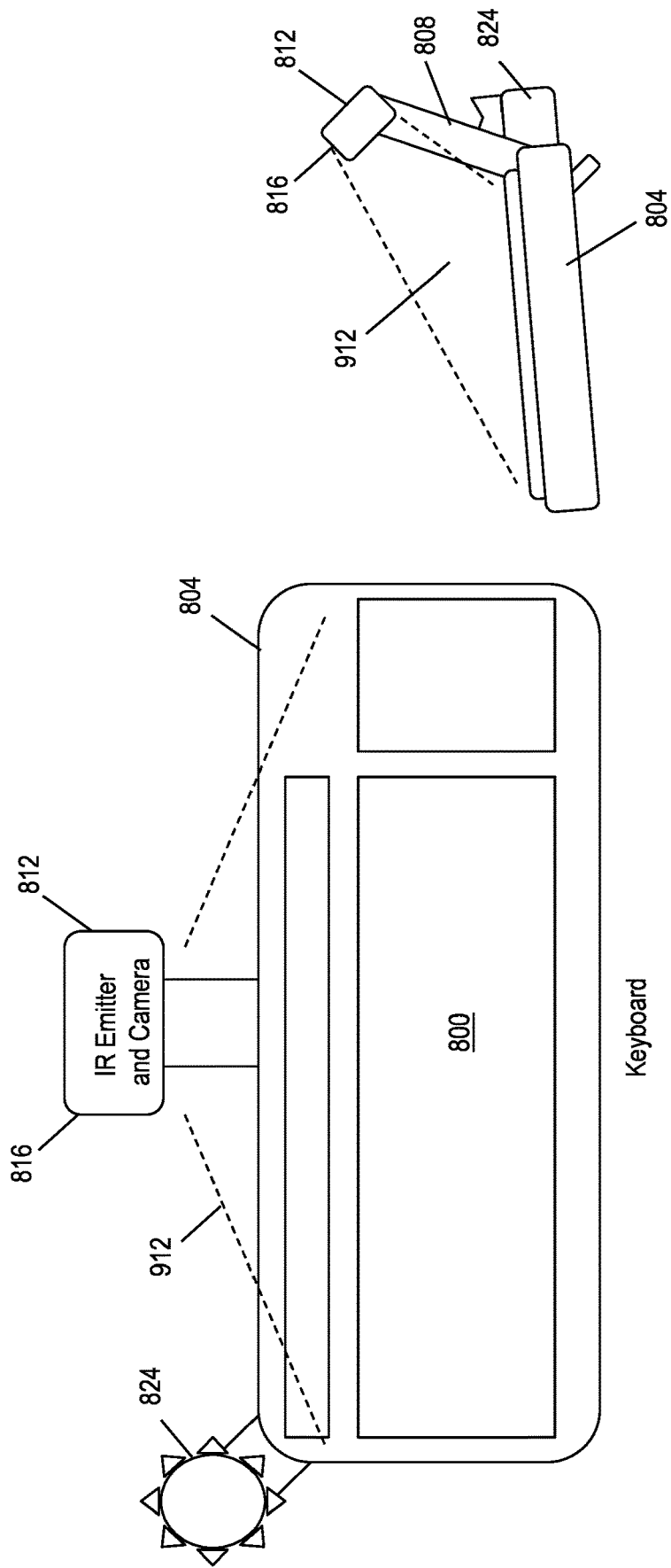

FIGS. 9A-9B illustrate embodiments a desktop system 900 using the virtualizing accessory device 800. In one or more embodiments, the desktop system 900 can include a computer device 908, which may include a viewing screen and the accessory device 800. The desktop system 900 can include VR goggles 904, which can provide a VR viewing environment for the user. The accessory device 800 can be used as an input device to the computer device 908. The user can interact with the accessory device 800 to control a VR application that is executing at the computer device 908 or that is executing remotely, such as on a remote server, while video, audio, and control data is streamed through the computer device 908. In one or more embodiments, the camera device 816 if the accessory device 800 can capture video and/or still image information from an operational area 912 of the accessory device 800. The camera device 816 can capture imaging information that includes the keyboard device 804 and the user's hand(s) as they interact with the keyboard device 804. A light source 812, such as an Infrared Emitter, can be included in the accessory device 800. The light source 812 can project light into operational area 912 of keyboard device 804. The projected light can be reflected by objects in the operational area 912, including the keyboard device 804 and the hand(s) of the user.

Figure 10:
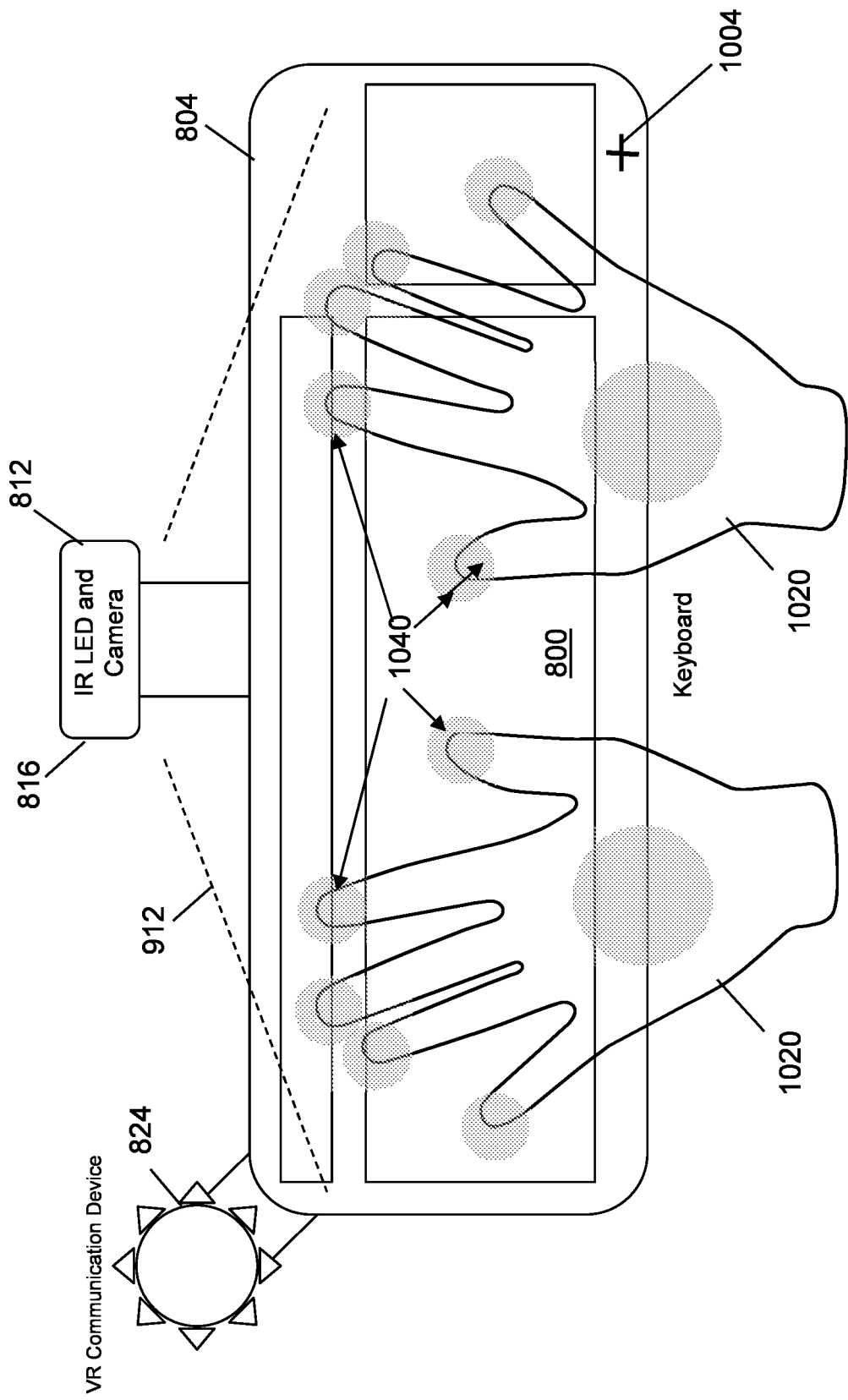
FIG. 10 depicts an illustrative embodiment of a virtualized accessory device capturing information from a user's hands.

FIG. 10 illustrates embodiments for detecting hand images and/or hand feature information using the accessory device 800. In one or more embodiments, the accessory device 800 can detect hand images and/or hand feature information by capturing images (light) from the operational area 912. In various embodiments, the hand image and/or feature information can be captured using an image from the visible light spectrum, or from a part of the spectrum (e.g., infrared light).

In one or more embodiments, the accessory device 800 can project light into the operational area 912 using the light source 812. In one example, an Infrared (IR) spectrum light source 812 can be used. IR light can be invisible to the naked eye and, therefore, can provide a light source that does not distract from the user or other people in the room. In addition, by providing light of a known wavelength (or wavelength range) to the operational area 912, the camera device 816 can employ filtering techniques to block out light of other wavelengths while receiving a strong reflected light signal for processing. In another embodiment, the user may wear reflective gloves or finger cots on his/her hands 102. The reflective gloves or cots can be made to reflect light in the wavelength of the light source 812, while absorbing other wavelengths of light, to increase the light signal-to-noise ratio (SNR) in the wavelength of interest. The camera device 816 can receive the light that is reflected from the hand(s) 1020 at hand features of interest, such as the fingertips 1040.

In one or more embodiments, the accessory device 800 can omit the light source 812 and simply capture images from the operational area 912 based on ambient light and/or light that is emitted from the hand(s) 1020 and/or the keyboard 804. For example, heat from the hand(s) 1020 can give off radiation in the IR spectrum. The camera device 816 can capture the emitted IR from the hand(s) 1020 and use this for processing hand image and hand feature information. In one embodiment, the user can wear gloves that accentuate the IR emission in areas of interest on the hand(s) 1020. For example, gloves could expose fingertips 1040 while covering other parts of the hand(s) 1020 so that IR emission from non-fingertip areas are significantly reduced or eliminated. In this way, IR emissions from the fingertip areas are accentuated in the IR images captured at the camera device 816. In one or more embodiments, the camera device 816 can capture light that is emitted from the hand(s) 1020 and/or keyboard device 804 along with light that is reflected from the hand(s) 1020 and/or keyboard device 804.

In one embodiment, light can be reflected or emitted from keyboard device 804 at specific locations on the keyboard device 804. For example, positioning and/or alignment markings 1004 can be included on the keyboard device 804, where these markings can reflect light at a specific wavelength (e.g., IR light coming from the light source 812) or emit light at a specific wavelength (e.g., IR light coming from a light source internal to the keyboard device 804. Keyboard markings 1004 can provide the camera device 816 with positive location and orientation information. A single marking 1004 can allow the keyboard device 804 to be located with respect to the camera device 816, while multiple markings 1004 can provide rotational information. In one or more embodiments, the location and/or orientation of the keyboard device 804 can be fixed and known in relation to the camera device 816. For example, where the camera device 816 is attached to the keyboard device 804, as with the mounting arm 808, the relative location of the camera device 816, with respect to the keyboard device 804, can be known and unchanging. In this case, it may not be necessary to determine the location and/or orientation of keyboard device 804 and known location/orientation information may be used for purposes of providing context to the user's hand(s).

As described above with respect to FIG. 7B, images received at the camera device 816 can include information associated with the operational area above the keyboard device 804. The camera device 816 can transmit raw image data to the VR communication device 824 or can process the image data prior to sending it to the VR communication device 824. In one embodiment, the camera device 816 can process raw image data to detect hand images and/or hand feature information. In one embodiment, the VR communication device 824 can receive the raw image from the camera device 816, and the VR communication device 824 can process the raw image data into hand images and/or hand feature information. In one embodiment, the VR communication device 824 can transmit the raw image data to the VR Operating System, which can process the raw image data into hand images and/or hand feature information.

In one or more embodiments, the hand feature information, which is processed from the captured image data, can include information in the form of modeling data for the hand(s) 1020 of the user. The modeling data can include location and vectoring information for the features of each hand 1020 that are extracted from the hand images captured at the camera device 816. The modeling data can be input into software hand models to reproduce the movements of the key features—the fingers and thumbs, as well as the macro movements of the hands.

Figure 11:
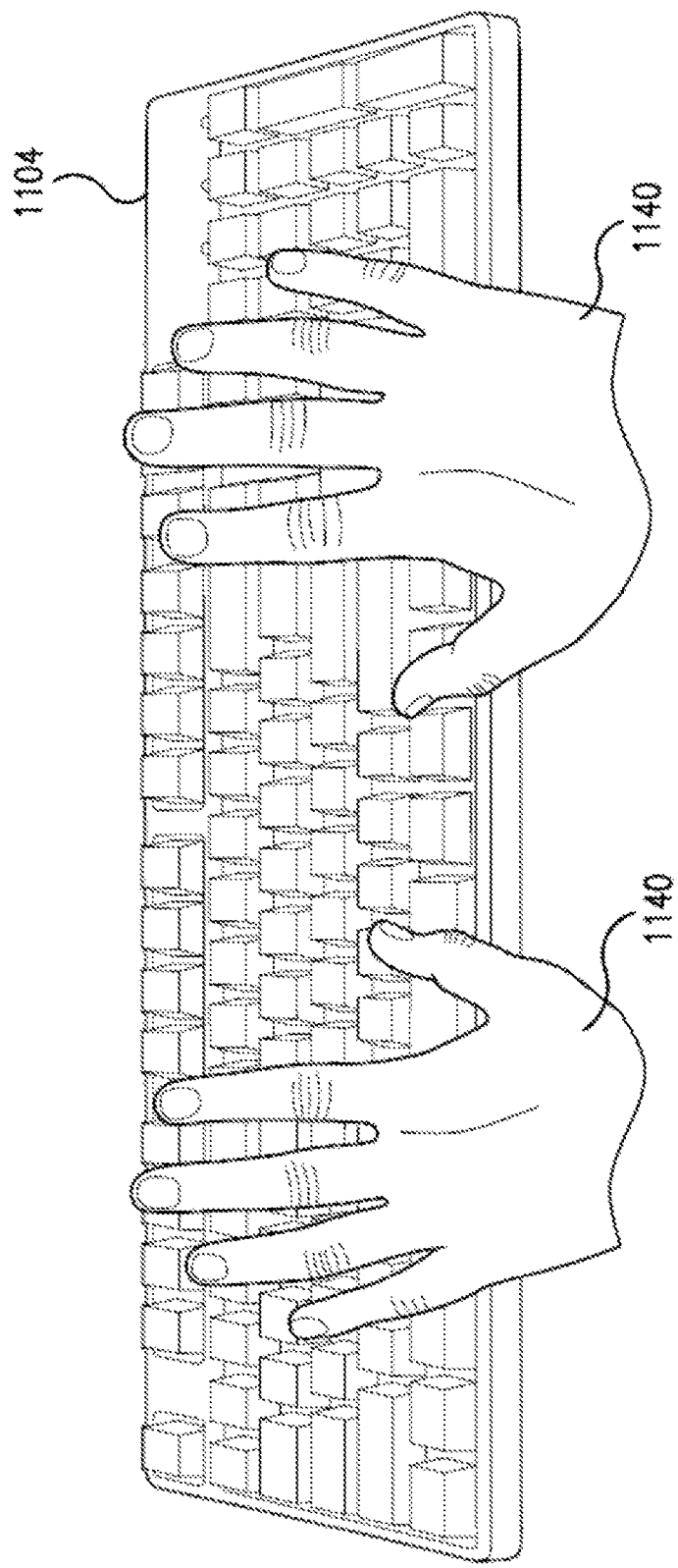
FIG. 11 depicts an illustrative embodiment of generating a virtual accessory device and virtual hands for display in a virtual application.

In one or more embodiments, the hand feature information and the location information for the keyboard device 804 can be mapped together, or combined, at the camera device 816, the VR communication device 824, or the VR Operating System, to generate hand-device interaction information. In this process, the physical location and movements of the hand(s) 1020 can be mapped to the physical location and orientation of the keyboard device 804 such that the contextual relationship between the hand(s) 1020 and the keyboard device 804 are modeled. For example, the camera can capture a movement of the right ring finger that corresponds to pressing of a keyboard character, and, when this movement is mapped to the current location and orientation of the keyboard device 804, the apparent key press is determined to be the letter "L." When mapped together, hand-device interaction information is generated. This hand-device interaction information can be used to generate a real-time, VR hand-keyboard 1100 of the hand(s) 1140 and the keyboard device 1104, as shown in FIG. 11. Each real-time movement of the user's hand(s) 1020 in the operational area 912 of keyboard device 804 is thereby captured, processed, and converted into a real-time set of hand-device interaction data that tracks relational movements of the real hand(s) 1020 and the real keyboard device 804 and translates these real-world movements into VR movements in real-time. As a result, when the user's right ring finger of his real hand(s) 1020 strikes the letter "L" on the real keyboard device 804, then hand-device interaction information reflects this movement, in real-time, and a VR recreations of the hand(s) 1120 and keyboard 1104 in the VR environment of FIG. 11, will reflect this movement.

In one or more embodiments, the hand-device interaction information can be corrected using information from the AMS system. The correction can be performed at the camera device 816, the VR communication device 824, and/or the VR Operating System. In one embodiment, the AMS system can provide stimulation and/or substitution information for the keyboard device 804. The stimulation information can be captured by the AMS based on actual keystrokes or user inputs into the keyboard device 804, and, therefore, the stimulation information can be an accurate reflection of the user interactions that are occurring in real-time. The hand-device interaction information that is derived from images captured at the camera device 816 can be compared to the AMS-based stimulation information. Where there are discrepancies between the AMS-based stimulations and the image-based hand-device interaction information, the image-based hand-device interaction information can be corrected. For example, image-based hand-device interaction information may indicate that the user is hitting a series of keystrokes that are offset from the actual AMS-based stimulations by one key (e.g., the images are offset one key to the right of the real keystrokes). Rather than recreating this error in a VR version of the hand(s) 1140 and keyboard device 1104, the hand-device interaction information can be corrected to "shift" the keyboard location to the right. As a result, the VR keyboard 1104 that is reproduced in the VR environment will shift to the right—with respect to the VR hands 1140—and the user will be presented with a VR hand-keyboard 1100 that better reflect the real-world situation. In one or more embodiments, the VR communication device 824 can send actual images of the user hand(s) and/or keyboard device 804 to the VR Operating System. In such a case, the VR Operating System may be capable of superimposing the actual images of the user hand(s) and/or keyboard device 804 on images from a VR application.

Figure 12A:
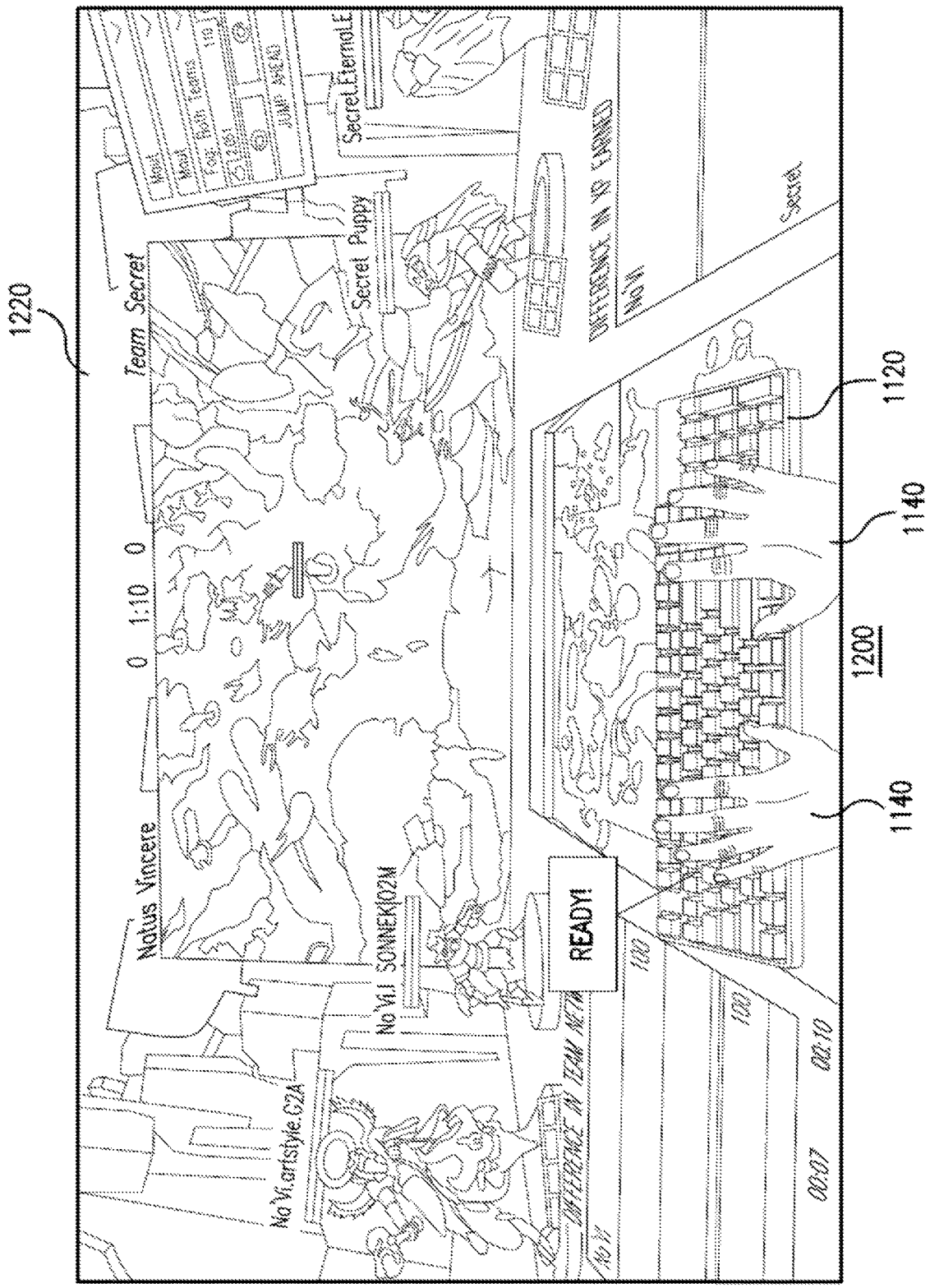
FIGS. 12A and 12B depict illustrative embodiments of virtual applications incorporating a virtual accessory device and virtual hands.
Figure 12B:
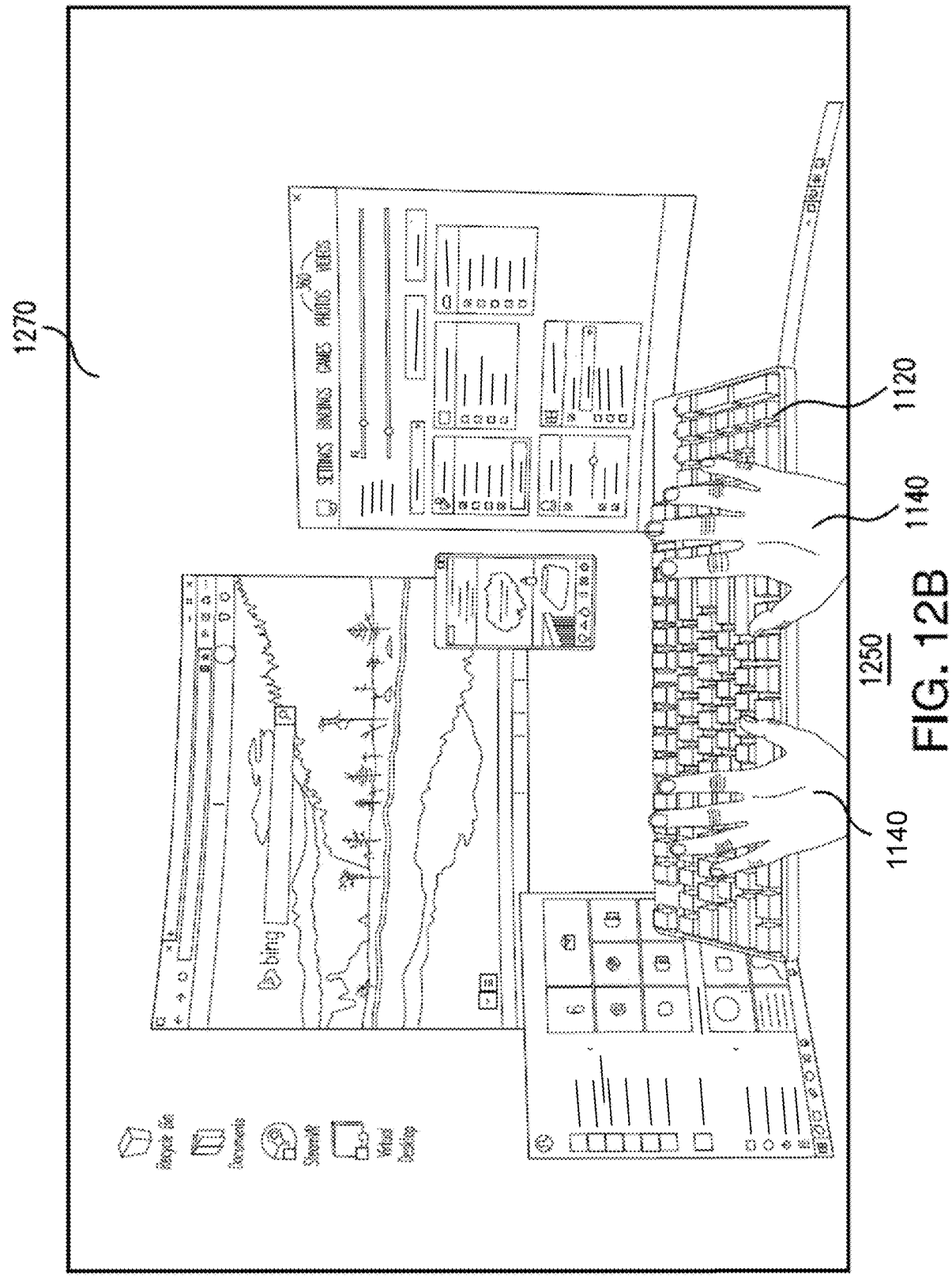

FIGS. 12A-12B depict illustrative embodiments of how the VR hands 1140 and VR keyboard 1120 can be overlaid onto a VR display 1220 for a VR gaming application 1200 and a VR display 1270 for a VR business application 1250. In each case, the user of VR goggles can obstruct the user's view of his/her hands and keyboard. The VR hands 1140 and VR keyboard 1120 provide the user with real-time visibility of the relationship between hand(s) and keyboard and allow them to quickly reference keypad locations, even from their peripheral vision, while staying entirely in the VR environment.

In one or more embodiments, the VR communication device 824 can include a data path to input data into the VR Operating System. One example of a VR communication device can be a Vive Tracker™, which is manufactured by the HTC Corporation (Taiwan). One example of a VR Operation System is SteamOS™, which was developed by the Valve Corporation (United States). In one embodiment, the hand-device interaction information can be provided to the VR communication device 824 via a direct connection to the camera device 816. The VR communication device 824 can engage in a wireless communication session with the VR Operating System, which can be executing on the computer device 904. The VR communication device 824 can translate the hand-device interaction information for the hand and keyboard model to a format that fits the VR Operating System before transmitting the hand-device interaction information to the VR Operating System. The VR Operating System can then provide hand-device interaction information to a VR application, using, for example, a VR API. The VR application can use the hand-device interaction information to generate the VR versions of the hand(s) 1140 and the keyboard 1104 for overlay onto the current window into the VR environment.

In one or more embodiments, the VR communication device 824 can receive the AMS stimulation and/or stimulation substitution information and transmit the stimulation and/or stimulation substitution information to the VR Operating System using the wireless communication session. The VR Operating System can provide the stimulation and/or stimulation substitution information to the VR application, which can use the stimulation and/or stimulation substitution information as user input/control for the VR application.

In one or more embodiments, hand images and hand feature information can be captured and determined using a CMOS image sensor based on a gesture recognition analysis. In gesture recognition, reflections and absorptions of the lighting source 812 interacting with the user's hand(s) and/or finger(s) is used to capture and compare hand gestures. These gestures can correspond to known hand forms used during the entry of data and/or entry of movement commands (e.g., left arrow, up arrow) into the keyboard device 804.

In one embodiment, the light source 812 can be an Infrared Light Emitting Diode (LED). In one embodiment, the keyboard device 804 can have a top surface that, generally, absorbs light in the wavelength that is projected from the light source 812. For example, the keyboard device 804 can generally absorb Infrared light—with the exception of the positional markings 1004, which can reflect Infrared light. By placing the user's hand(s) 1020 above this generally absorbing background, most of the Infrared light that is reflected and captured at the camera device 816 will be coming from the user's hand(s) 1020. The camera device 816 can identify the outline of the hands and use pattern recognition and/or Artificial Intelligence (AI) training to identify the position of the fingertips 1040 with respect to the keyboard device 804. This positioning can be made more certain by combining with the keypad presses that are tracked by the AMS system. By combining the two—Infrared images and keystrokes—an accurate Three-dimensional (3D) model of the hand/finger action with respect to the keyboard device 804 can be determined.

In one or more embodiments, the real-time, hand-device interaction information can be injected into the VR Operating System via the VR communication device 824. The VR Operating System can then provide the 3D model information to overlay a Virtual keyboard and virtual hands onto the Virtual application.

Figure 13:
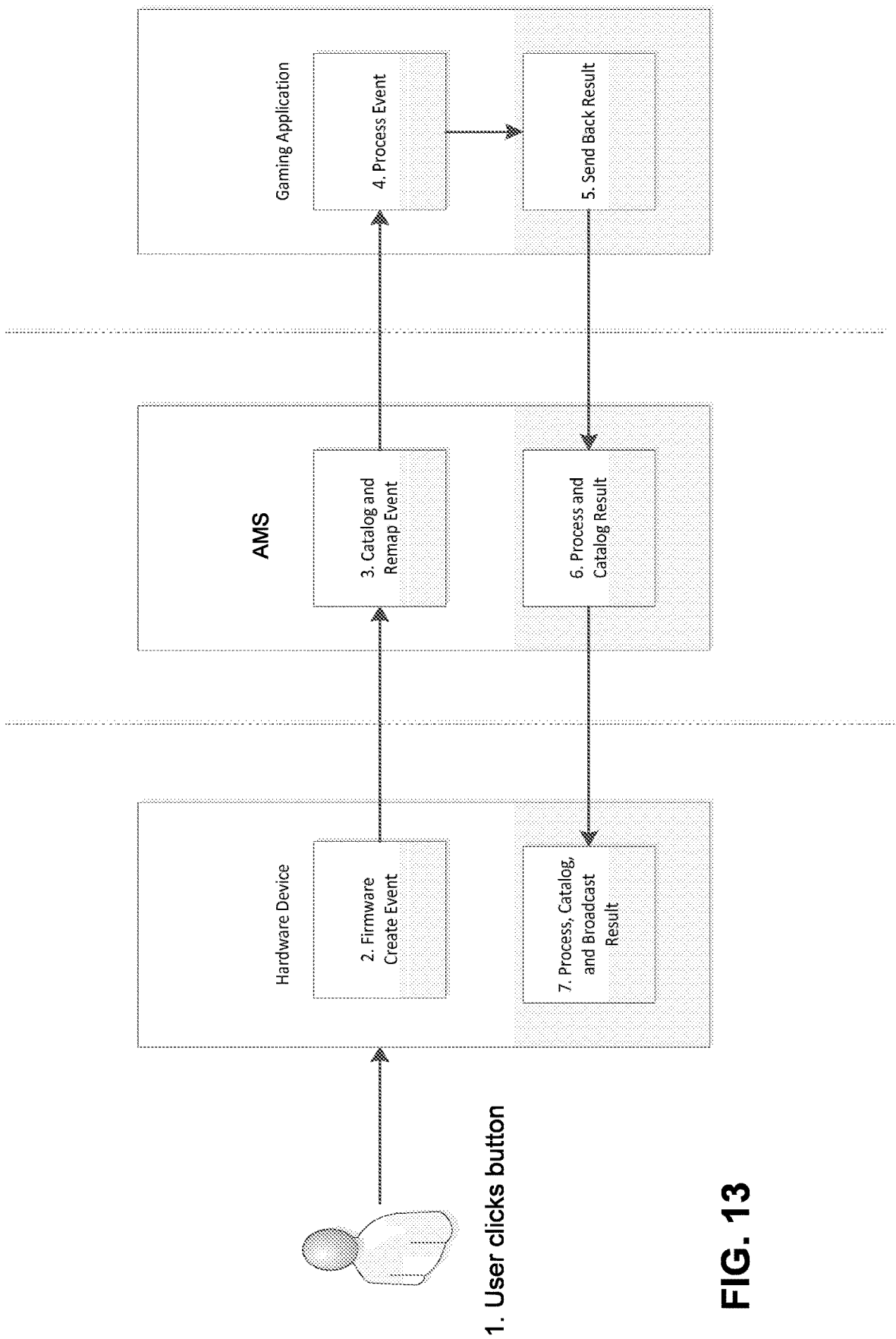
FIG. 13 depicts an illustrative embodiment of a system operating at least in part according to the methods of FIGS. 5-7B.
Figure 14:
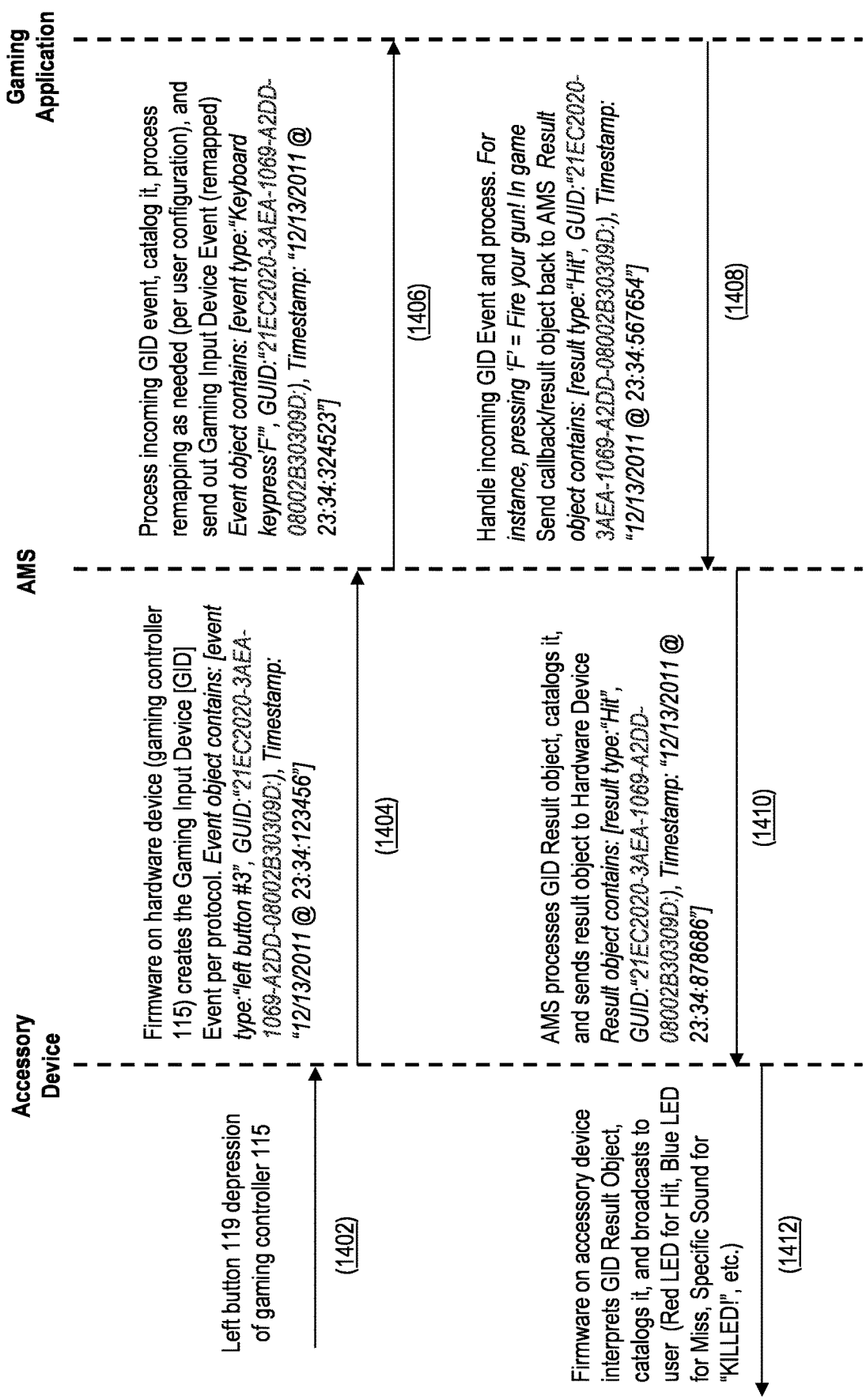
FIG. 14 depicts an illustrative embodiment of a communication flow diagram utilized by the system of FIG. 13.

FIGS. 13-14 illustrate embodiments of a system with a corresponding communication flow diagram for correlating stimulations and gaming action results. In this illustration a user clicks the left button 119 of the gaming controller 115. The gaming controller 115 can include firmware (or circuitry), which creates an event as depicted by event 2 in FIG.

13. The button depression and the event creation are depicted in FIG. 14 as steps 1402 and 1404. In step 1404, the firmware of the gaming controller 115 can, for example, generate an event type "left button #3", and a unique GUID with a time stamp which is submitted to the AMS application. Referring back to FIG. 13, the AMS application catalogues event 3, and if a substitute stimulation has been predefined, remaps the event according to the substitution. The remapped event is then transmitted to the gaming application at event 4. Event 3 of FIG. 8 is depicted as step 1406 in FIG. 14. In this illustration, the AMS application substitutes the left button #3 depression stimulus with a "keyboard 'F'" depression which can be interpreted by the gaming application as a fire command. The AMS application in this illustration continues to use the same GUID but substitutes the time stamp for another time stamp to identify when the substitution took place.

Referring back to event 4, the gaming application processes the event and sends back at event 5 a game action result to the AMS application which is processed by the AMS application at event 6. The AMS application then submits the results to the accessory at event 7. Events 4 and 5 are depicted as step 1408 in FIG. 14. In this step, the gaming application processes "F" as an action to fire the gamer's gun, and then determines from the action the result from logistical gaming results generated by the gaming application. In the present illustration, the action of firing resulted in a hit. The gaming application submits to the AMS application the result type "Hit" along with a new time stamp, while utilizing the same GUID for tracking purposes. At step 1410, the AMS application correlates the stimulation "left button #3 (and/or the substitute stimulation keyboard "F") to the game result "Hit" and catalogues them in memory. The AMS application then submits to the accessory (e.g., gaming controller 115) in step 1410 the game action results "Hit" with the same GUID, and a new time stamp indicating when the result was received. Upon receiving the message from the AMS application, the accessory in step 1412 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

Upon reviewing the aforementioned embodiments, it would be evident to an artisan with ordinary skill in the art that the embodiments of the subject disclosure can be modified, reduced, or enhanced without departing from the scope of the claims described below. For example, the AMS application can be executed from an accessory 115 or computing device 206 to perform the embodiments described in the subject disclosure. The AMS application can also be operated from a remote server ("cloud services"). In yet another embodiment, functions of the AMS application can be distributed between devices. In yet another embodiment, the AMS application can be configured to track the performance of a gamer and adapt a threshold as the gamer improves or declines in performance.

For instance, as a gamer's performance improves with a particular gaming action, the threshold associated with the gaming action can be adapted to be less sensitive in detecting an over usage state. Similarly, the sensitivity of the threshold can be increased to promptly identify an over usage state of a gaming action if the gamer's performance declines as a result of an over usage of the gaming action. Additionally, the AMS application can be adapted to add gaming actions to an exclusion table when the gamer's performance substantially improves as a result of using the gaming action being excluded. The exclusion table can also be changed by the AMS application by removing a gaming action from the exclusion table responsive to its excessive use causing a decline in a gamer's performance.

Other embodiments can be applied to the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 15:
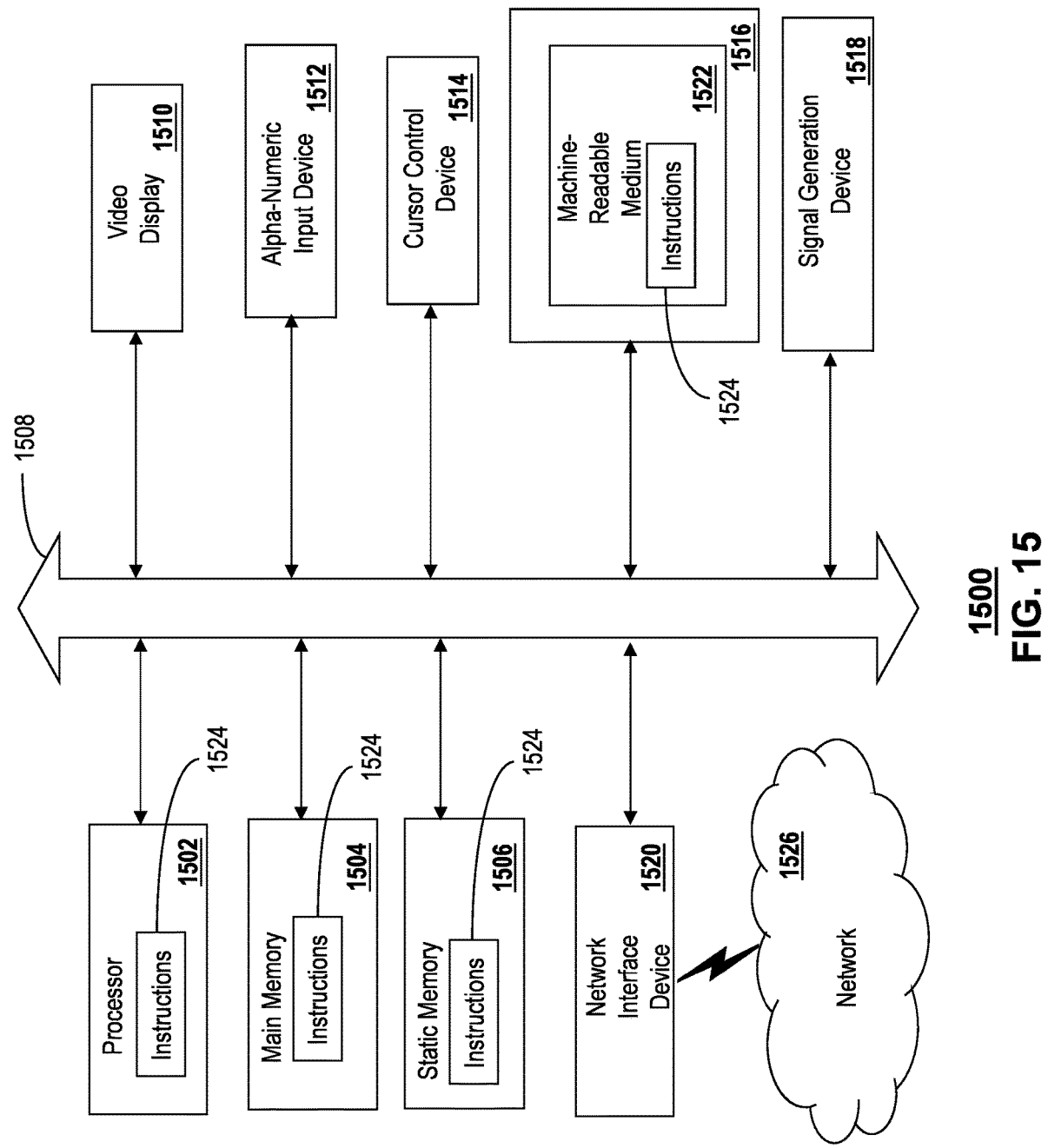
FIG. 15 depicts an illustrative diagrammatic representation of a machine in the form of a computer system within which a set of instructions, when executed, may cause the machine to perform any one or more of the methodologies disclosed herein.

FIG. 15 depicts an exemplary diagrammatic representation of a machine in the form of a computer system 1500 within which a set of instructions, when executed, may cause the machine to perform any one or more of the methods described above. One or more instances of the machine can operate, for example, as an accessory, computing device or combinations thereof. In some embodiments, the machine may be connected (e.g., using a network 1526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor (or controller) 1502 (e.g., a central processing unit (CPU)), a graphics processing unit (GPU, or both), a main memory 1504 and a static memory 1506, which communicate with each other via a bus 1508. The computer system 1500 may further include a display unit 1510 (e.g., a liquid crystal display (LCD), a flat panel, or a solid-state display). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520. In distributed environments, the embodiments described in the subject disclosure can be adapted to utilize multiple display units 1510 controlled by two or more computer systems 1500. In this configuration, presentations described by the subject disclosure may in part be shown in a first of the display units 1510, while the remaining portion is presented in a second of the display units 1510.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, Wi-Fi, Zigbee®), and long-range communications (e.g., WiMAX, GSM, CDMA, LTE) can be used by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations," this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, comprising:
   identifying, by a processing system including a processor, a first location of a virtual finger and a second location of a virtual keyboard device;
   identifying, by the processing system, a virtual stimulation operation according to the first location of the virtual finger and the second location of the virtual keyboard device;
   comparing, by the processing system, the virtual stimulation operation with an actual stimulation operation to detect a difference, wherein the actual stimulation operation comprises user interaction with a physical keyboard device; and
   modifying, by the processing system, the first location of the virtual finger, to obtain a modified virtual finger location, responsive to detecting the difference, wherein the modified virtual finger location corresponds to an updated virtual stimulation that equates to the actual stimulation operation.

2. The method of claim 1, further comprising:
   transmitting, by the processing system, the modified virtual finger location to a virtual reality system,
   wherein the modified virtual finger location is provided to a virtual reality application by the virtual reality system,
   wherein the virtual reality application superimposes a first image of the first location of the virtual finger and a second image of the virtual keyboard device onto a virtual reality display of the virtual reality application according to the modified virtual finger location, and
   wherein an input based on actual stimulation data generated by the physical keyboard device is provided to the virtual reality system, the input being preferred over the virtual stimulation operation.

3. The method of claim 2, further comprising: translating, by the processing system, the virtual stimulation operation into a format compatible with the virtual reality system prior to the transmitting of the modified virtual finger location to the virtual reality system, wherein the virtual stimulation operation is converted to the format compatible with the virtual reality system by a conversion unit attached to the physical keyboard device.

4. The method of claim 1, wherein a mapping of the first location of the virtual finger and the second location of the virtual keyboard device is obtained from a virtual reality system.

5. The method of claim 1, further comprising: providing, by the processing system, actual stimulation data generated by the physical keyboard device to a virtual reality system.

6. The method of claim 5, wherein the actual stimulation data is provided to a virtual reality application by way of the virtual reality system.

7. The method of claim 6, wherein the virtual reality application comprises a virtual reality gaming application.

8. The method of claim 4, wherein the virtual reality system comprises a virtual reality operating system.

9. The method of claim 1, further comprising:
   recording, by the processing system, an association between first stimulation data that can be generated by the physical keyboard device and a first substitute keyboard stimulation;
   receiving, by the processing system, actual stimulation data from the physical keyboard device;
   detecting, by the processing system, a match between the actual stimulation data that is received from the physical keyboard device and the association between the first stimulation data and the first substitute keyboard stimulation;
   retrieving, by the processing system, the first substitute keyboard stimulation responsive to detecting the match; and
   replacing, by the processing system, the actual stimulation data that is received from the physical keyboard device with the first substitute keyboard stimulation to generate actual substitute stimulation data generated by the physical keyboard device prior to transmission of the actual substitute stimulation data to a virtual reality system.

10. A non-transitory, machine-readable storage medium, comprising instructions, wherein responsive to executing the instructions, a processing system including a processor performs operations comprising:
   identifying a virtual stimulation operation of a virtual accessory device according to a virtual hand-device interaction of between a virtual hand and the virtual accessory device;
   comparing the virtual stimulation operation with physical stimulation data to detect a difference, wherein user interaction with a physical accessory device generates the physical stimulation data, and wherein the physical stimulation data corresponds to an actual stimulation operation; and
   modifying the virtual hand-device interaction to generate modified virtual hand-device interaction responsive to detecting the difference, wherein the modified virtual hand-device interaction corrects the virtual hand-device interaction so that the virtual hand-device interaction indicated by an apparent location of the virtual hand and the virtual accessory device agrees with the user interaction with the physical accessory device.

11. The non-transitory, machine-readable storage medium of claim 10, wherein the operations further comprise:
providing the modified virtual hand-device interaction to a virtual reality system,
wherein the modified virtual hand-device interaction is provided by the virtual reality system to a virtual reality application, and
wherein the virtual reality application superimposes the virtual hand and the virtual accessory device onto a virtual reality display of the virtual reality application according to the modified virtual hand-device interaction.

12. The non-transitory, machine-readable storage medium of claim 11, wherein the virtual reality application comprises a virtual reality gaming application.

13. The non-transitory, machine-readable storage medium of claim 10, wherein the physical stimulation data is transmitted to a virtual reality system.

14. The non-transitory, machine-readable storage medium of claim 13, wherein the virtual reality system comprises a virtual reality operating system.

15. The non-transitory, machine-readable storage medium of claim 10, wherein the operations further comprise:
recording an association between first stimulation data that can be generated by the physical accessory device and a first substitute accessory stimulation;
receiving the physical stimulation data from the physical accessory device;
detecting a match between the physical stimulation data that is received from the physical accessory device and the association between the first stimulation data and the first substitute accessory stimulation;
retrieving the first substitute accessory stimulation responsive to detecting the match; and
replacing the physical stimulation data that is received from the physical accessory device with the first substitute accessory stimulation to generate physical substitute stimulation data generated by the physical accessory device prior to transmission of the physical substitute stimulation data to a virtual reality system.

16. The non-transitory, machine-readable storage medium of claim 15, wherein the operations further comprise:
receiving image information from an operational space associated with the physical accessory device; and
determining location information associated with the physical accessory device and a proximate hand of a user according to the image information that is received, wherein the location information corresponds to the physical substitute stimulation data.

17. A device, comprising:
a processing system including a processor; and
a memory that stores executable instructions that, when executed by the processing system, facilitate performance of operations, the operations comprising:
identifying a virtual stimulation operation of a virtual accessory device that corresponds to virtual hand-device interaction information according to a mapping of a virtual hand and virtual accessory device location information;
comparing the virtual stimulation operation with actual stimulation data to detect a disagreement, wherein a user interaction with a physical accessory device generates the actual stimulation data; and
modifying the virtual hand-device interaction information to generate modified virtual hand-device interaction information responsive to the disagreement, wherein the modified virtual hand-device interaction information corrects the virtual hand-device interaction information so that an apparent location of a virtual hand-device interaction indicated by virtual stimulation operation agrees with an actual location of the user interaction of the physical accessory device dictated by the actual stimulation data.

18. The device of claim 17, wherein the operations further comprise:
providing the modified virtual hand-device interaction information to a virtual reality system,
wherein the modified virtual hand-device interaction information is provided by the virtual reality system to a virtual reality application, and
wherein the virtual reality application superimposes a virtual hand and the virtual accessory device onto a virtual reality display of the virtual reality application according to the modified virtual hand-device interaction information.

19. The device of claim 18, wherein the virtual reality system comprises a virtual reality operating system.

20. The device of claim 18, wherein the virtual reality application comprises a virtual reality gaming application.

* * * * *